US012585376B2

(12) United States Patent
Weinig et al.

(10) Patent No.: US 12,585,376 B2
(45) Date of Patent: Mar. 24, 2026

(54) SYSTEMS AND METHODS OF REDUCING OBSTRUCTION BY THREE-DIMENSIONAL CONTENT

(71) Applicant: Apple Inc., Cupertino, CA (US)

(72) Inventors: Samuel M. Weinig, San Francisco, CA (US); Lucie Belanger, Beloeil (CA); Angel Suet Yan Cheung, San Francisco, CA (US); David H. Huang, San Mateo, CA (US); Dean Jackson, Yass (AU)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 18/335,978

(22) Filed: Jun. 15, 2023

(65) Prior Publication Data

US 2024/0004536 A1    Jan. 4, 2024

Related U.S. Application Data

(60) Provisional application No. 63/376,848, filed on Sep. 23, 2022, provisional application No. 63/367,470, filed on Jun. 30, 2022.

(51) Int. Cl.
*G06F 3/04845* (2022.01)
*G06F 3/01* (2006.01)
*G06F 3/04815* (2022.01)
*G06F 3/0483* (2013.01)
(Continued)

(52) U.S. Cl.
CPC .......... *G06F 3/04845* (2013.01); *G06F 3/011* (2013.01); *G06F 3/04815* (2013.01); *G06F*
*3/0483* (2013.01); *G06F 3/0485* (2013.01); *G06F 3/0486* (2013.01)

(58) Field of Classification Search
None
See application file for complete search history.

(56) References Cited

U.S. PATENT DOCUMENTS

| | | | |
|---|---|---|---|
| 9,129,644 B2 * | 9/2015 | Gay ........................ | G06T 15/00 |
| 9,874,990 B2 * | 1/2018 | Khalatian ............. | G06F 3/0481 |
| 10,339,721 B1 * | 7/2019 | Dascola .................. | G06F 3/011 |

(Continued)

OTHER PUBLICATIONS

AUSSIE @ THE_VR_BAR, "#janusVR So now you can pull pages out of your web browser, and pull 3D objects out of that page #virtualreality #VR", Twitter Tweet, Available online at: https://twitter.com/The_VR_Bar/ status/631257283796688898, Aug. 12, 2015 [retrieved on Jun. 26, 2023], 1 page.

(Continued)

*Primary Examiner* — Tuyetlien T Tran
(74) *Attorney, Agent, or Firm* — Kubota & Basol LLP

(57) ABSTRACT

Methods for preventing three-dimensional content from obscuring portions of a web browser or other user interface in a three-dimensional environment. In some embodiments, the methods include applying one or more visual treatments to the three-dimensional content. In some embodiments, the methods further include applying one or more visual treatments to portions of the web browser or portions of the other user interface. In some embodiments, the one or more visual treatments are applied at least from a viewpoint of a user. In some embodiments, applying the or more visual treatments is based on a three-dimensional visual effect of the three-dimensional content.

20 Claims, 24 Drawing Sheets

(51) Int. Cl.
   *G06F 3/0485*     (2022.01)
   *G06F 3/0486*     (2013.01)

(56) References Cited

U.S. PATENT DOCUMENTS

| | | | | |
|---|---|---|---|---|
| 10,863,230 | B1 * | 12/2020 | Pham | H04N 21/6547 |
| 11,153,235 | B1 * | 10/2021 | Dalonzo | H04L 51/42 |
| 11,204,678 | B1 * | 12/2021 | Baker | G06F 3/04842 |
| 11,487,398 | B1 * | 11/2022 | Wei | G09G 5/14 |
| 2009/0009424 | A1 * | 1/2009 | Kang | H04N 5/45 |
| | | | | 345/1.3 |
| 2014/0310292 | A1 * | 10/2014 | Marquess | H04L 69/22 |
| | | | | 707/755 |
| 2014/0380171 | A1 * | 12/2014 | Maloney | G06F 3/04847 |
| | | | | 715/732 |
| 2017/0357418 | A1 * | 12/2017 | Dunn | G06F 3/0481 |
| 2018/0007449 | A1 * | 1/2018 | Carlson | H04N 21/42209 |
| 2019/0346994 | A1 * | 11/2019 | Bastide | G06F 3/013 |
| 2019/0377476 | A1 * | 12/2019 | Wong | G06F 3/0486 |
| 2020/0043243 | A1 * | 2/2020 | Bhushan | G06F 1/1686 |
| 2020/0302698 | A1 * | 9/2020 | Boissiere | G06T 19/006 |
| 2020/0412780 | A1 * | 12/2020 | Devendran | G06N 20/00 |
| 2021/0048680 | A1 * | 2/2021 | Deliz Centeno | G02B 27/0172 |
| 2021/0241518 | A1 * | 8/2021 | Tong | H04N 23/60 |
| 2022/0006972 | A1 * | 1/2022 | Jia | H04N 7/147 |
| 2022/0101612 | A1 * | 3/2022 | Palangie | G06V 10/143 |
| 2022/0155909 | A1 * | 5/2022 | Kawashima | G06F 3/04815 |
| 2022/0366659 | A1 * | 11/2022 | Blakeley | G06F 3/167 |
| 2023/0230333 | A1 * | 7/2023 | Kawamae | G06F 3/011 |
| | | | | 345/419 |
| 2023/0252957 | A1 * | 8/2023 | Hung | G09G 5/14 |
| | | | | 715/790 |
| 2023/0410436 | A1 * | 12/2023 | Beauchamp | G06V 20/20 |

OTHER PUBLICATIONS

Carlton, Bobby, "Firefox Reality Brings Secure VR Web Browsing To Oculus Quest", VRScout, Available online at: https://vrscout.com/news/firefox-reality-vr-browser-oculus-quest/, Jul. 25, 2019, 10 pages.

Chartier, David, "Hands on: ExitReality, another useless 3D Internet tool", Ars Technica, Available online at: https://arstechnica.com/information-technology/2008/09/hands-on-exitreality-another-useless-3d-internet-tool/, Sep. 19, 2008, 7 pages.

\* cited by examiner

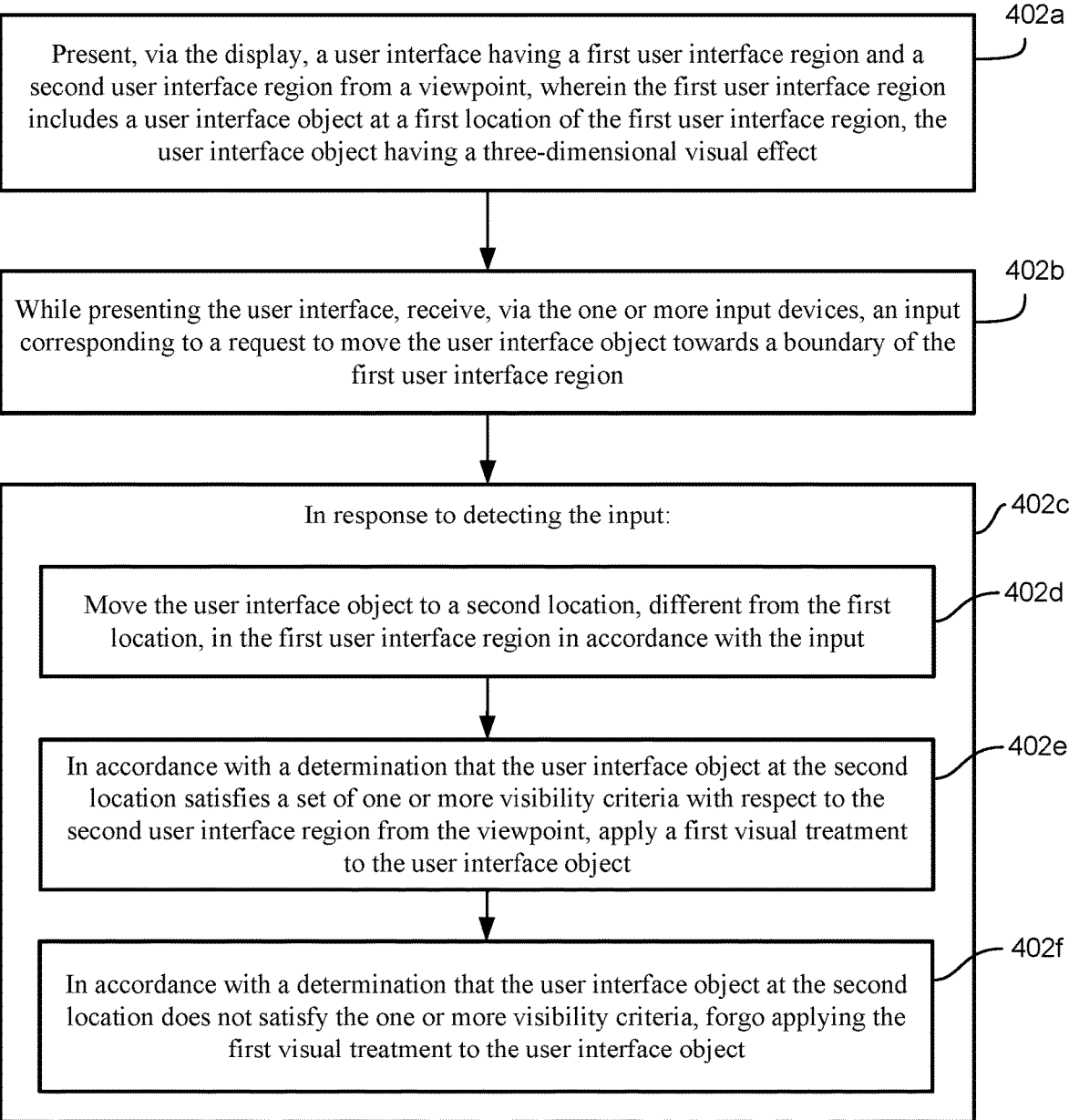

400

402a

Present, via the display, a user interface having a first user interface region and a second user interface region from a viewpoint, wherein the first user interface region includes a user interface object at a first location of the first user interface region, the user interface object having a three-dimensional visual effect 402b While presenting the user interface, receive, via the one or more input devices, an input corresponding to a request to move the user interface object towards a boundary of the first user interface region 402c In response to detecting the input:

402d

Move the user interface object to a second location, different from the first location, in the first user interface region in accordance with the input 402e In accordance with a determination that the user interface object at the second location satisfies a set of one or more visibility criteria with respect to the second user interface region from the viewpoint, apply a first visual treatment to the user interface object 402f In accordance with a determination that the user interface object at the second location does not satisfy the one or more visibility criteria, forgo applying the first visual treatment to the user interface object

FIG. 4

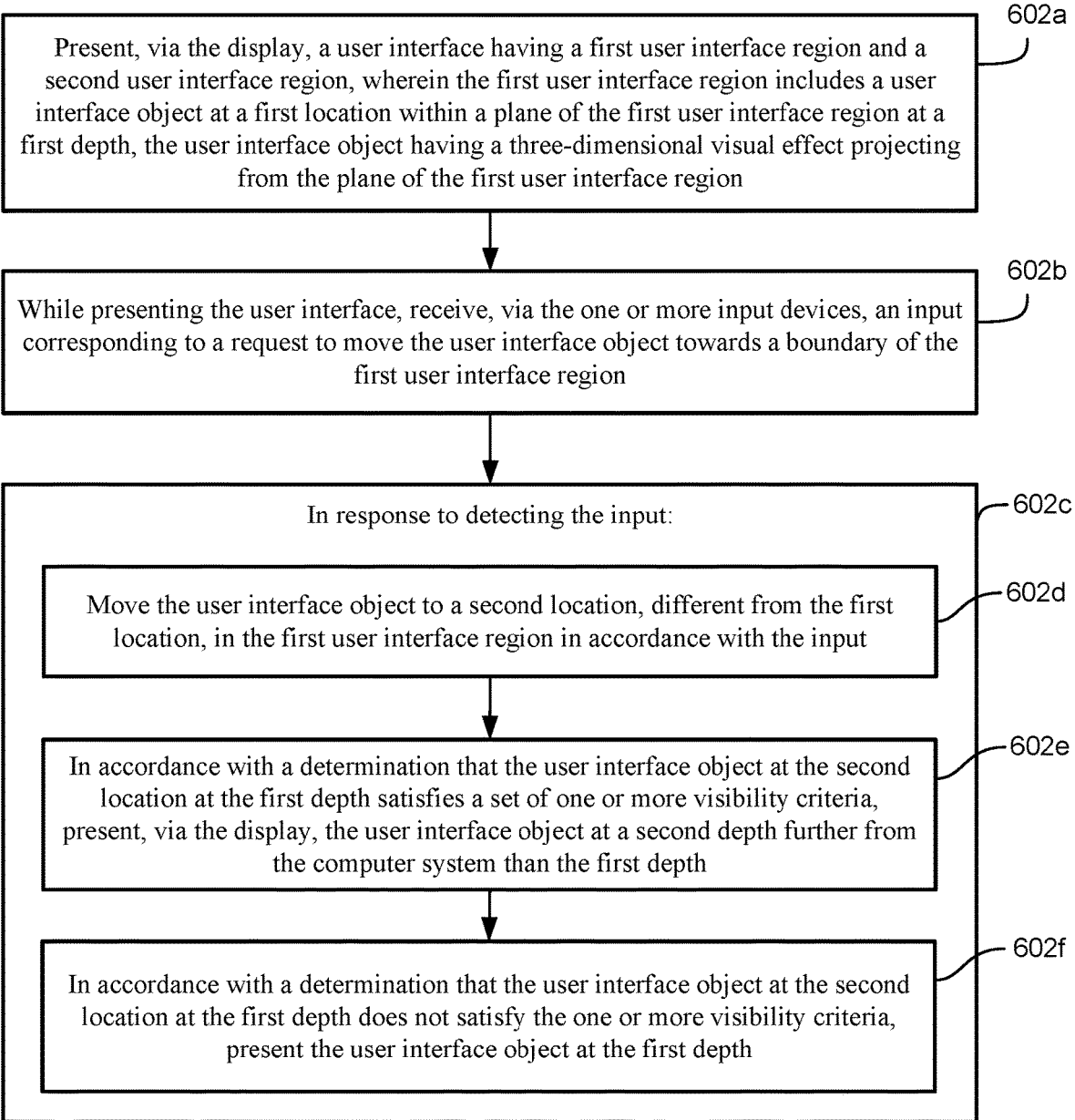

600

602a
Present, via the display, a user interface having a first user interface region and a second user interface region, wherein the first user interface region includes a user interface object at a first location within a plane of the first user interface region at a first depth, the user interface object having a three-dimensional visual effect projecting from the plane of the first user interface region 602b
While presenting the user interface, receive, via the one or more input devices, an input corresponding to a request to move the user interface object towards a boundary of the first user interface region 602c
In response to detecting the input:

602d
Move the user interface object to a second location, different from the first location, in the first user interface region in accordance with the input 602e
In accordance with a determination that the user interface object at the second location at the first depth satisfies a set of one or more visibility criteria, present, via the display, the user interface object at a second depth further from the computer system than the first depth 602f
In accordance with a determination that the user interface object at the second location at the first depth does not satisfy the one or more visibility criteria, present the user interface object at the first depth

Figure 8:
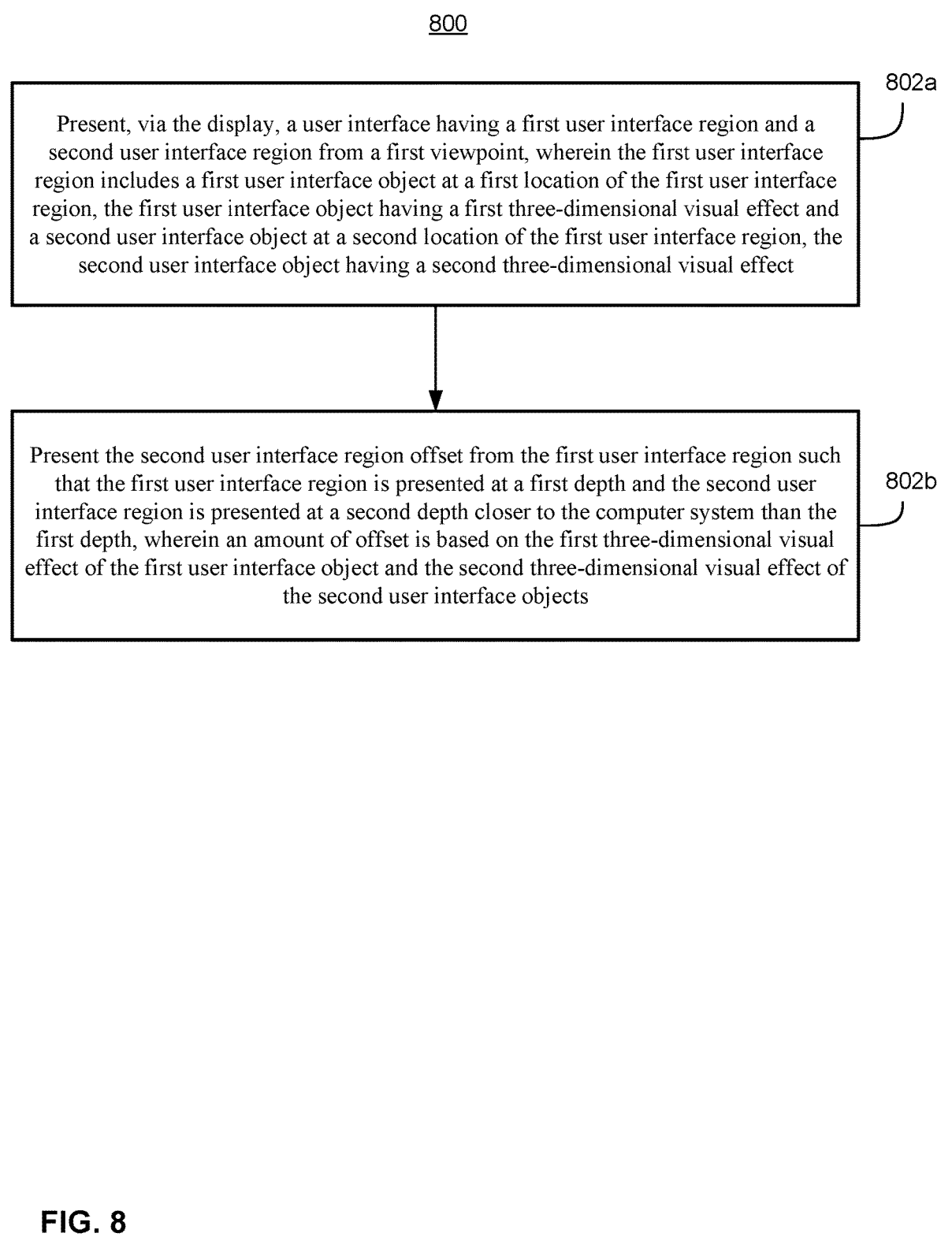

Present, via the display, a user interface having a first user interface region and a second user interface region from a first viewpoint, wherein the first user interface region includes a first user interface object at a first location of the first user interface region, the first user interface object having a first three-dimensional visual effect and a second user interface object at a second location of the first user interface region, the second user interface object having a second three-dimensional visual effect 802a Present the second user interface region offset from the first user interface region such that the first user interface region is presented at a first depth and the second user interface region is presented at a second depth closer to the computer system than the first depth, wherein an amount of offset is based on the first three-dimensional visual effect of the first user interface object and the second three-dimensional visual effect of the second user interface objects 802b

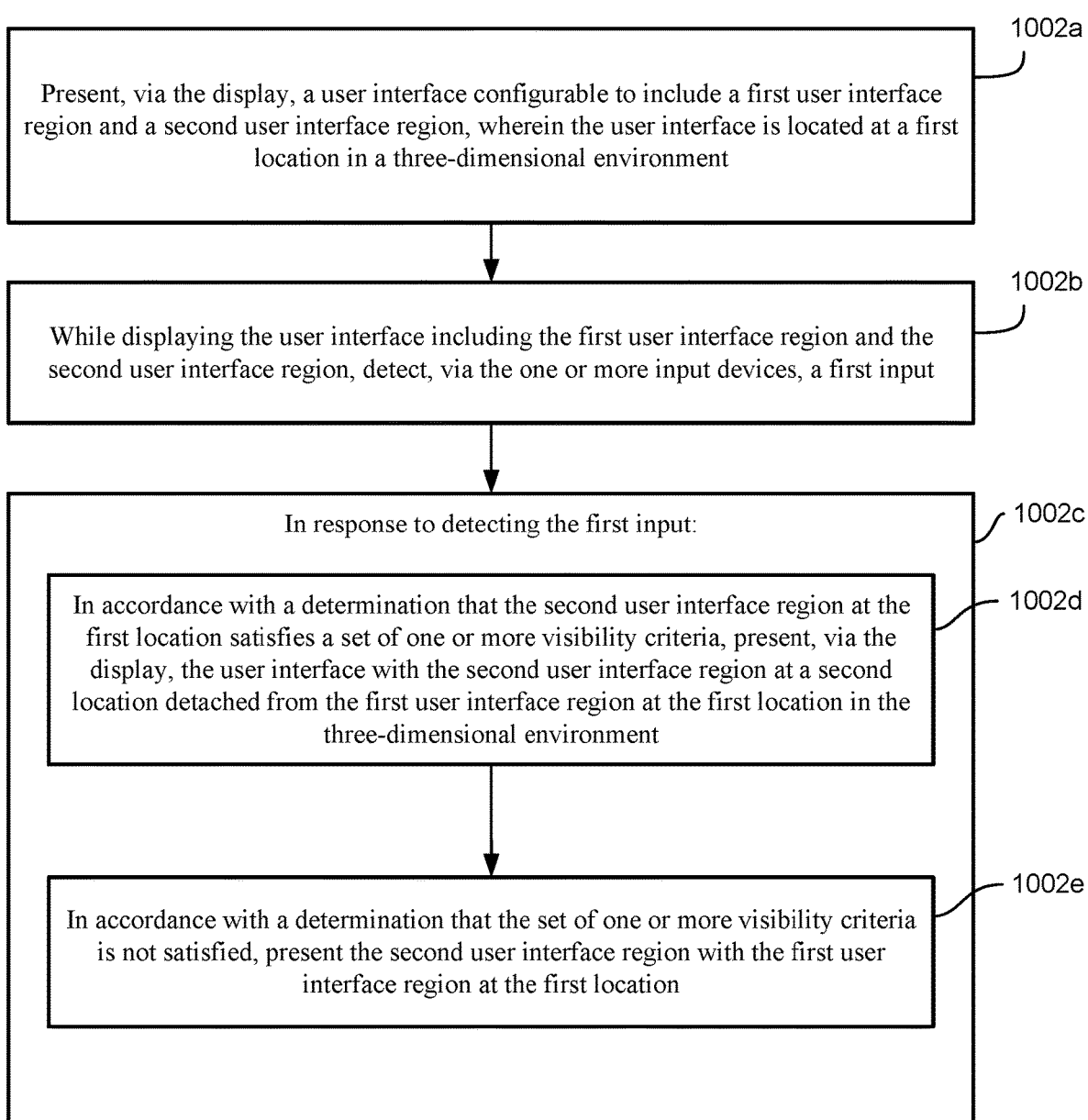

Present, via the display, a user interface configurable to include a first user interface region and a second user interface region, wherein the user interface is located at a first location in a three-dimensional environment 1002a While displaying the user interface including the first user interface region and the second user interface region, detect, via the one or more input devices, a first input 1002b In response to detecting the first input:

1002c

In accordance with a determination that the second user interface region at the first location satisfies a set of one or more visibility criteria, present, via the display, the user interface with the second user interface region at a second location detached from the first user interface region at the first location in the three-dimensional environment 1002d In accordance with a determination that the set of one or more visibility criteria is not satisfied, present the second user interface region with the first user interface region at the first location 1002e

FIG. 10

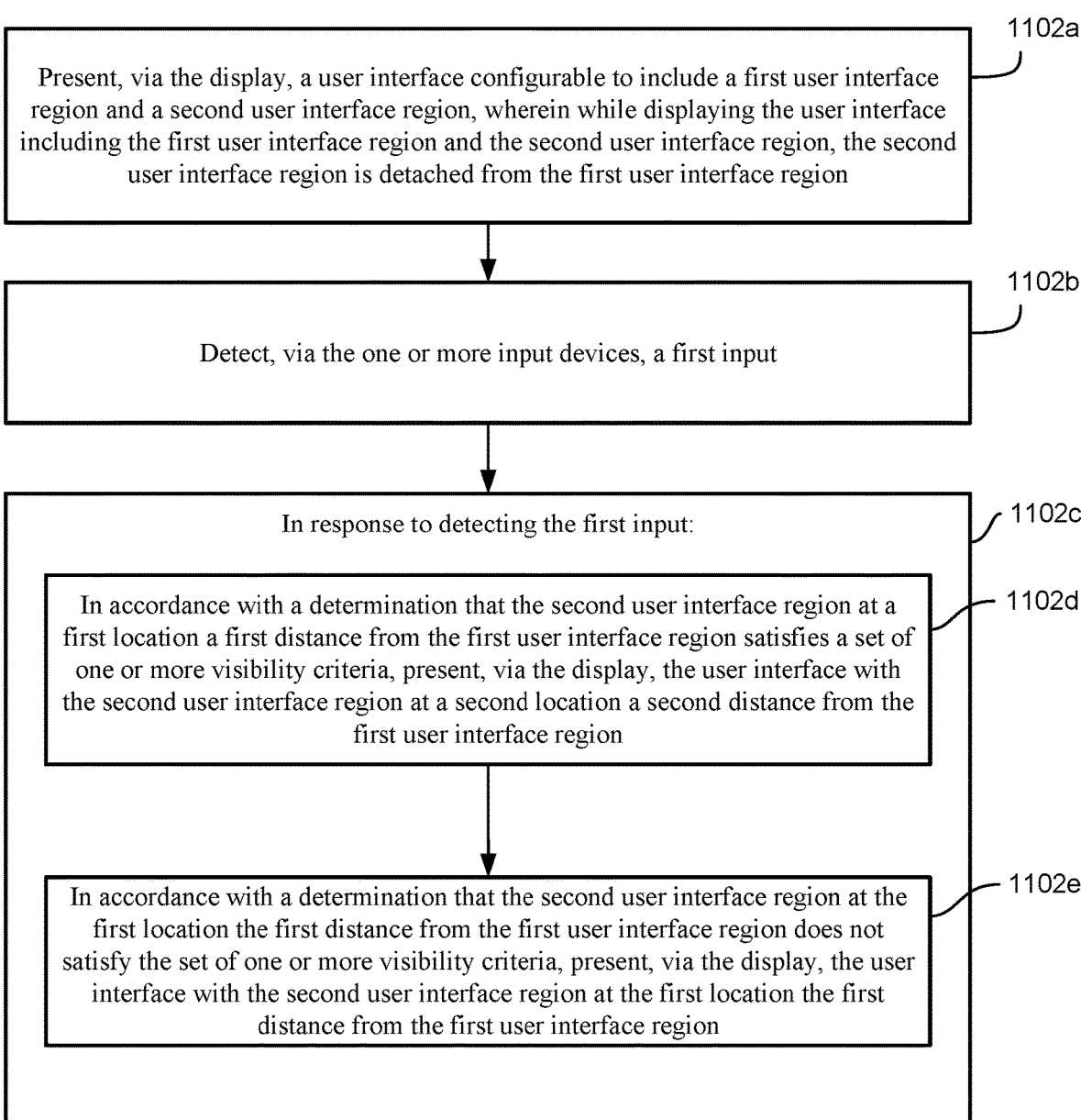

1100

1102a

Present, via the display, a user interface configurable to include a first user interface region and a second user interface region, wherein while displaying the user interface including the first user interface region and the second user interface region, the second user interface region is detached from the first user interface region 1102b Detect, via the one or more input devices, a first input 1102c In response to detecting the first input:

1102d

In accordance with a determination that the second user interface region at a first location a first distance from the first user interface region satisfies a set of one or more visibility criteria, present, via the display, the user interface with the second user interface region at a second location a second distance from the first user interface region 1102e In accordance with a determination that the second user interface region at the first location the first distance from the first user interface region does not satisfy the set of one or more visibility criteria, present, via the display, the user interface with the second user interface region at the first location the first distance from the first user interface region

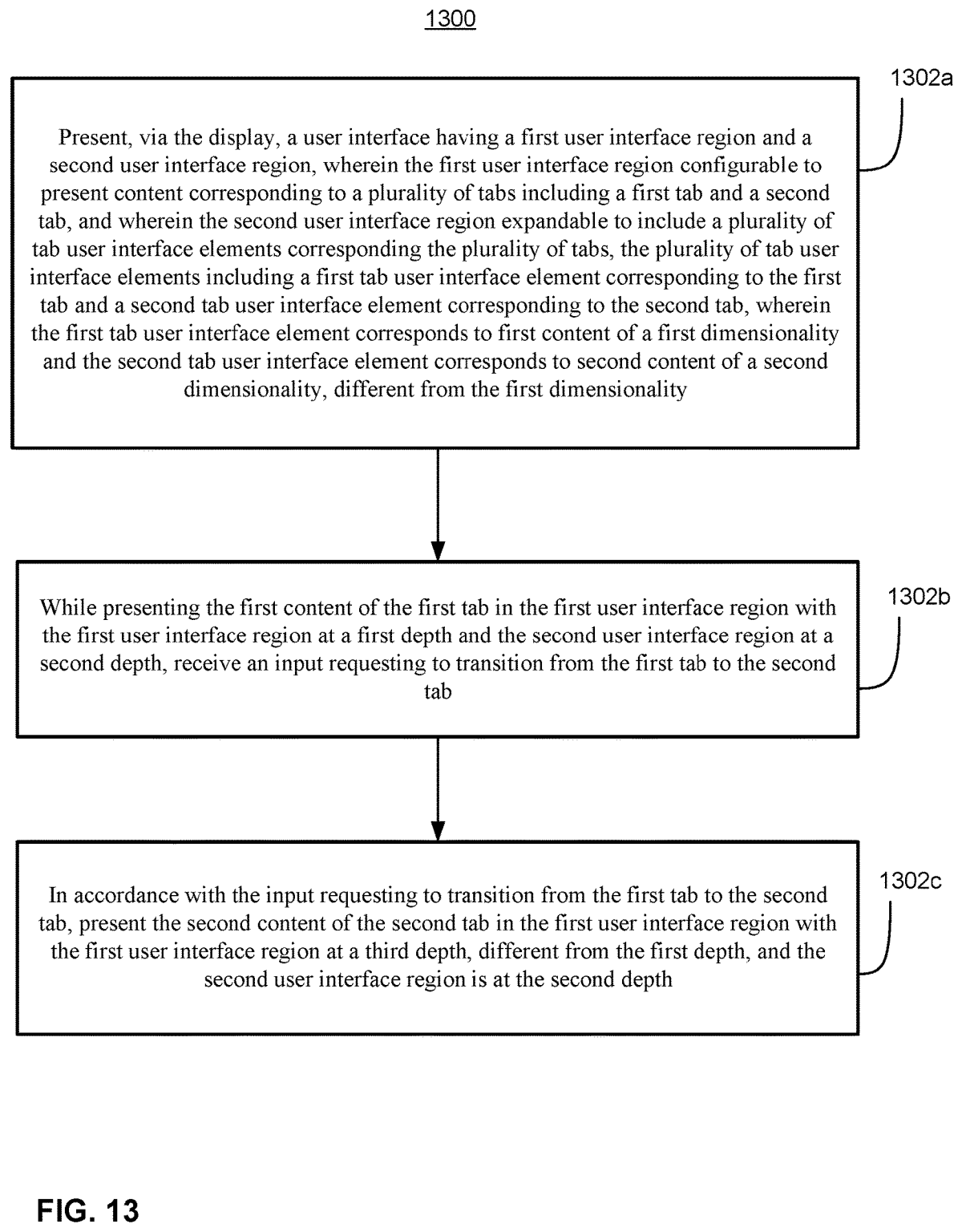

Present, via the display, a user interface having a first user interface region and a second user interface region, wherein the first user interface region configurable to present content corresponding to a plurality of tabs including a first tab and a second tab, and wherein the second user interface region expandable to include a plurality of tab user interface elements corresponding the plurality of tabs, the plurality of tab user interface elements including a first tab user interface element corresponding to the first tab and a second tab user interface element corresponding to the second tab, wherein the first tab user interface element corresponds to first content of a first dimensionality and the second tab user interface element corresponds to second content of a second dimensionality, different from the first dimensionality 1302b While presenting the first content of the first tab in the first user interface region with the first user interface region at a first depth and the second user interface region at a second depth, receive an input requesting to transition from the first tab to the second tab 1302c In accordance with the input requesting to transition from the first tab to the second tab, present the second content of the second tab in the first user interface region with the first user interface region at a third depth, different from the first depth, and the second user interface region is at the second depth

FIG. 13

SYSTEMS AND METHODS OF REDUCING OBSTRUCTION BY THREE-DIMENSIONAL CONTENT

CROSS-REFERENCE TO RELATED APPLICATIONS

This application claims the benefit of U.S. Provisional Application No. 63/367,470, filed Jun. 30, 2022, and U.S. Provisional Application No. 63/376,848, filed Sep. 23, 2022, the contents of which are incorporated herein by reference in their entireties for all purposes.

FIELD OF THE DISCLOSURE

This relates generally to systems and methods of preventing or reducing obstruction by three-dimensional content in a three-dimensional environment.

BACKGROUND OF THE DISCLOSURE

Three-dimensional content can be rendered in a three-dimensional environment. However, three-dimensional content may obstruct the view of other content.

SUMMARY OF THE DISCLOSURE

Some embodiments described in this disclosure are directed to systems and methods of preventing or reducing obstruction by three-dimensional content in a three-dimensional environment. In particular, in some embodiments, the systems and methods can prevent or reduce obstruction of a chrome region (e.g., a region of a web browser optionally including an address bar and/or a plurality of affordances of controls related to a web browser) by three-dimensional content in web browser. Some embodiments described in this disclosure are directed to systems and methods of applying visual treatments to the three-dimensional content and/or the web browser. These visual treatments prevent the three-dimensional content from obscuring (or reduce the amount of obstruction of) portions the web browser, other portions of other user interfaces and/or the three-dimensional environment, thereby improving user interaction and/or improving application security. The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 is a flow diagram illustrating a method of applying one or more visual treatments to three-dimensional content in accordance with some embodiments of the disclosure.

FIG. 6 is a flow diagram illustrating a method of applying one or more visual treatments to three-dimensional content in accordance with some embodiments of the disclosure.

FIG. 8 is a flow diagram illustrating a method of applying one or more visual treatments to the user interface in accordance with some embodiments of the disclosure.

FIGS. 10 and 11 are flow diagrams illustrating methods of applying one or more visual treatments to the user interface in accordance with some embodiments of the disclosure.

FIG. 13 is a flow diagram illustrating a method of applying one or more visual treatments to the user interface in accordance with some embodiments of the disclosure.

DETAILED DESCRIPTION

In the following description of embodiments, reference is made to the accompanying drawings which form a part hereof, and in which it is shown by way of illustration specific embodiments that are optionally practiced. It is to be understood that other embodiments are optionally used, and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective representation could be referred to as a "first" or "second" representation, without implying that the respective representation has different characteristics based merely on the fact that the respective representation is referred to as a "first" or "second" representation. On the other hand, a representation referred to as a "first" representation and a representation referred to as a "second" representation are both representation, but are not the same representation, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
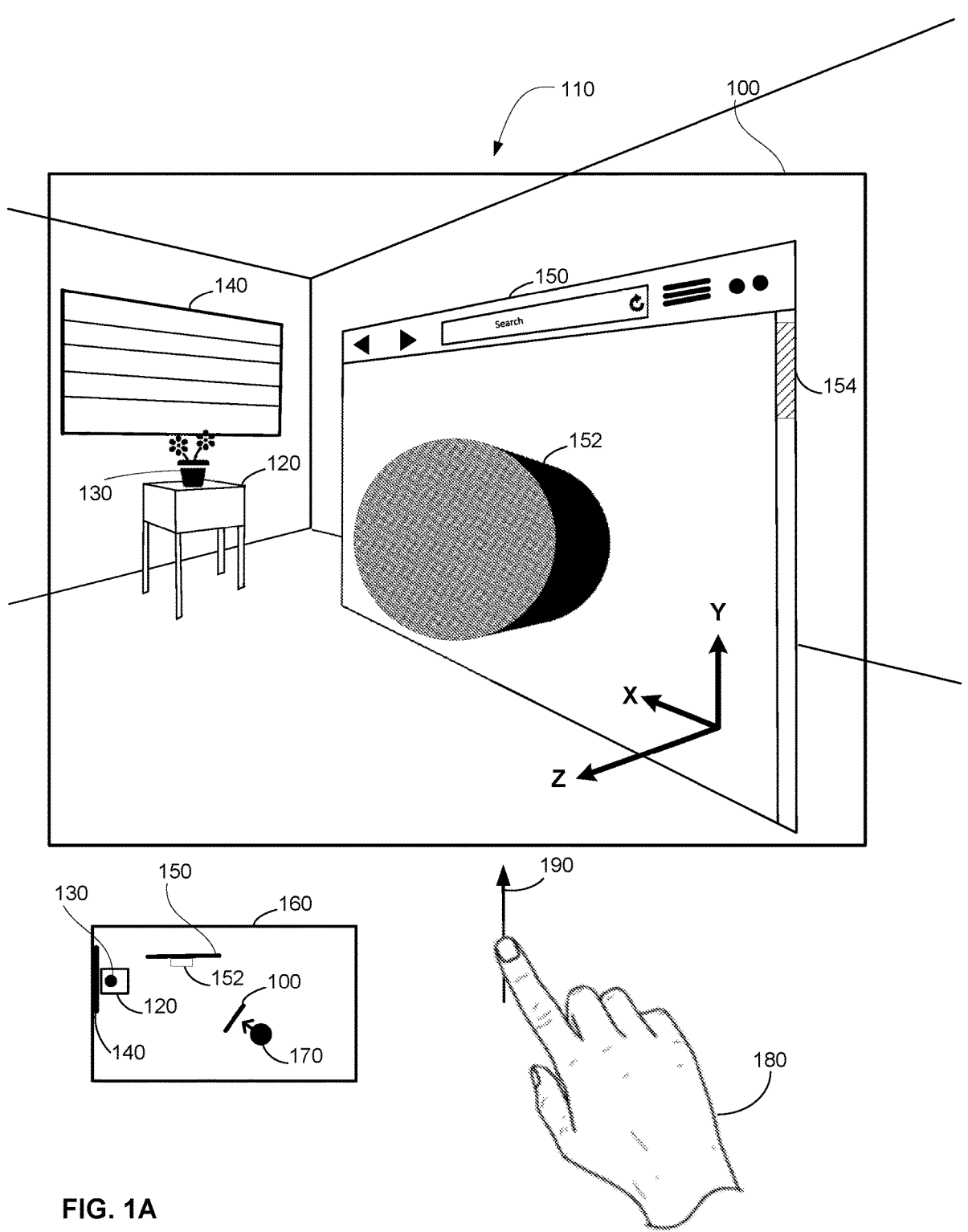
FIGS. 1A-1B illustrate an electronic device displaying a computer-generated environment and a view of a user interface object configurable to display three-dimensional content according to some embodiments of the disclosure.

FIG. 1A illustrates a computer system 100 displaying a computer-generated environment (e.g., an extended reality (XR) environment, a three-dimensional environment, etc.) according to some embodiments of the disclosure. The computer-generated environment is visible from a viewpoint 170 of a user illustrated in the overhead view 160 (e.g., facing the back corner and in-between two walls of the physical environment in which computer system 100 is located). In some embodiments, computer system 100 is a hand-held or mobile device, such as a tablet computer, laptop computer, smartphone, a wearable device, or head-mounted display. Examples of computer system 100 are described below with reference to the architecture block diagram of FIG. 2. As shown in FIG. 1A, computer system 100, table 120, flowerpot 130, and window 140 are located in the physical environment 110. In some embodiments, computer system 100 may be configured to capture areas of physical environment 110 including table 120, flowerpot 130, and window 140 (illustrated in the field of view of computer system 100). In some embodiments, in response to a trigger, the computer system 100 may be configured to display a user interface object 150 corresponding to a browser user interface of a web browser application in the computer-generated environment that is not present in the physical environment 110 (e.g., a virtual object), but is displayed in the computer-generated environment positioned in front of a wall and next to real-world table 120, flowerpot 130, and window 140. It should be understood that user interface object 150 is a representative object and one or more different objects (e.g., of various dimensionality such as two-dimensional or three-dimensional objects) can be included and rendered in a three-dimensional computer-generated environment. For example, the object can represent another application (e.g., not a web browser), or a user interface displayed in the computer-generated environment. In some embodiments, the user interface object 150 is configured to display three-dimensional content such as three-dimensional user interface object 152. Additionally, it should be understood, that the three-dimensional (3D) environment (or 3D object) described herein may be a representation of a 3D environment (or three-dimensional object) displayed in a two-dimensional (2D) context (e.g., displayed on a 2D screen).

In some embodiments, and as illustrated in FIG. 1A, the user's current location in the physical environment is facing a corner and in-between two walls and from viewpoint 170, the user interface object 150 is displayed in front of and/or against one of the walls and next to real-world table 120, flowerpot 130, and window 140. For example, the user interface object 150 or portions/sub-components of the user interface object 150 are optionally snapped or anchored to the wall of the physical environment, as shown in FIG. 1A. The arrangement of user interface object 150 and the physical contents of the physical environment are also reflected in the overhead view 160. The user interface object 150 optionally becomes snapped or anchored in response to being moved, or in response to movement of the user in the physical environment. Although, as depicted in FIG. 1A, the user interface object 150 is positioned with the x-axis and y-axis orientated away from viewpoint 170 from a particular prior viewpoint (or multiple prior viewpoints) of the user, it is understood that when not anchored to a surface the user interface object 150 may have an orientation floating in the three-dimensional environment or may automatically orient itself to align with the viewpoint of the user.

Figure 1B:
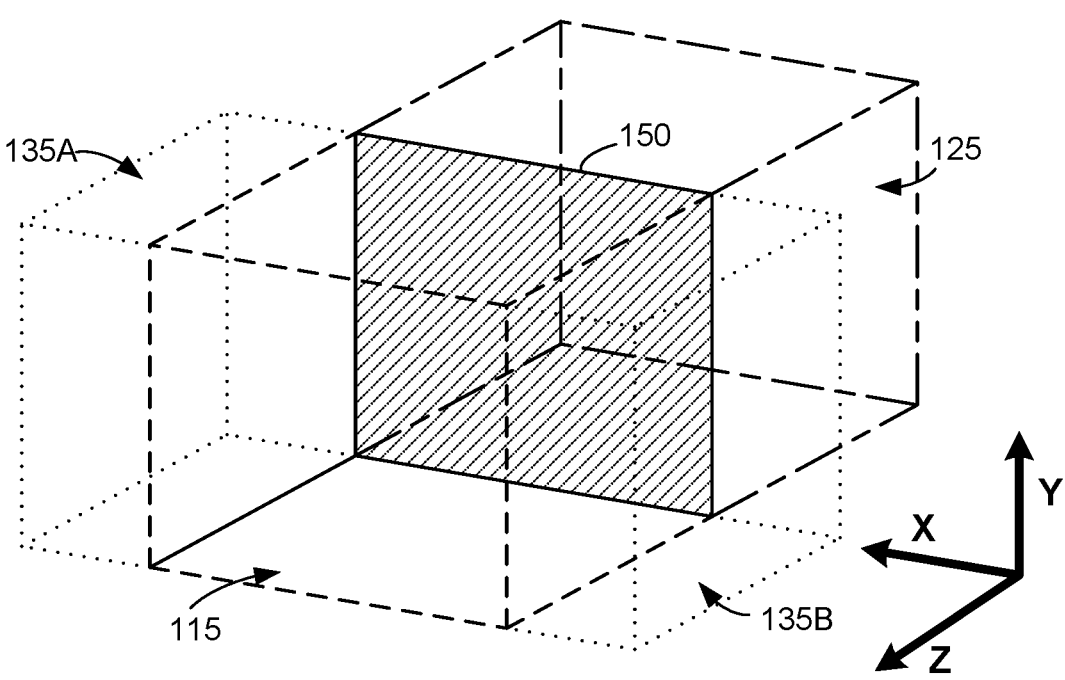

FIG. 1B illustrates a view of a user interface object 150 configurable to display three-dimensional content according to some embodiments of the disclosure. As shown in FIG. 1B, in some embodiments, the user interface object 150 can be presented as a planar, two-dimensional object or as a three-dimensional object including a planar, two-dimensional representation of the front face of user interface object 150. As described herein, in some embodiments, a three-dimensional user interface object 152 can be presented as projecting forward from the planar, two-dimensional user interface object (or the front face of the user interface object 150). In such embodiments, the projection from the planar, two-dimensional user interface object can be into a forward projection volume 115 shown in FIG. 1B. Additionally, in some embodiments, the projection from the planar, two-dimensional user interface object can extend to the side edges into lateral projection volumes 135A-135B. In some embodiments, a three-dimensional user interface object 152 can be pushed back in the three-dimensional environment and presented as projecting within or behind the planar, two-dimensional user interface object (or the front face of the user interface object 150). In such embodiments, the three-dimensional content can be pushed back into a rear projection volume 125 shown in FIG. 1B from which the three-dimensional content can project within or behind the planar, two-dimensional user interface object. Although not shown in FIG. 1B, it is understood that the rear projection volume 125, in some such embodiments, can include lateral projections volumes similar to lateral projection volumes 135A-135B. In some such embodiments, lateral projections volumes can be limited to the front of user interface object 150. Additionally, although not shown in FIG. 1B, it is understood that lateral projection volumes may not be limited to the left and right sides (e.g., in the x-dimension), but may additionally or alternatively be provided for the top and bottom sides (e.g., in the y-dimension). Additionally, it is understood that although the projection volumes shown in FIG. 1B are cubic that the projection volumes can have other geometric characteristics and the forward, rear, and/or lateral projection volumes can have the same or different dimensions and/or geometric characteristics. Additionally, it is understood that in some embodiments, some three-dimensional content can partially be disposed in one or more different projection volumes (e.g., the three-dimensional content can partially be pushed backward into the rear project volume and partially project forward into the forward and/or lateral projection volumes in front of the front face of user interface object 150). Moreover, it is understood that, in some embodiments, three-dimensional content located in rear projection volume 125 may only be visible when viewed through the front face of the user interface object 150 (e.g., as a portal into rear projection volume 125).

Figure 2:
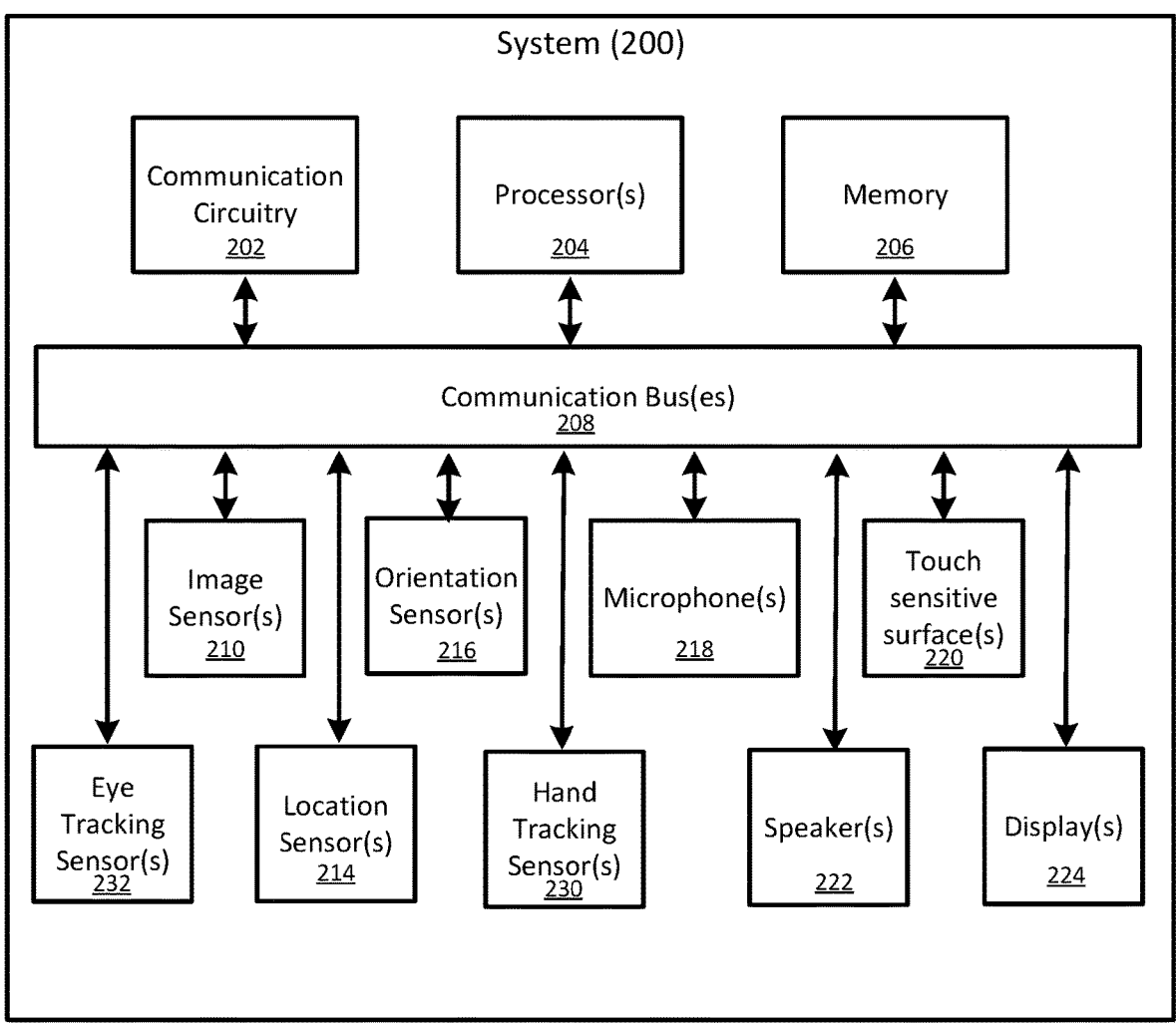
FIG. 2 illustrates a block diagram of an exemplary architecture for a device in accordance with some embodiments of the disclosure.

FIG. 2 illustrates a block diagram of an exemplary architecture for a device 200 in accordance with some embodiments of the disclosure. The blocks in FIG. 2 can represent an information processing apparatus for use in the device. In some embodiments, device 200 is a mobile device, such as a mobile phone (e.g., smart phone), a tablet computer, a laptop computer, a desktop computer, a wearable device, a head-mounted display, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, display generation component(s) 224, hand tracking sensor(s) 230, and/or eye tracking sensor(s) 232. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication (NFC) and/or short-range communication, such as Bluetooth®.

Processor(s) 204 include one or more general processors, one or more graphics processors, and/or one or more digital signal processors. In some embodiments, memory 206 a non-transitory computer-readable storage medium (e.g., flash memory, random access memory, or other volatile or non-volatile memory or storage) that stores computer-readable instructions (e.g., programs) configured to be executed by processor(s) 204 to perform the techniques, processes, and/or methods described below. In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, display generation component(s) 224 include a single display (e.g., a liquid-crystal display (LCD), organic light-emitting diode (OLED), or other types of display). In some embodiments, display generation component(s) 224 includes multiple displays. In some embodiments, display generation component(s) 224 can include a display with touch capability (e.g., a touch screen), a projector, a holographic projector, a retinal projector, etc. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200).

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real-world environment. Image sensor(s) 210 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 210 also optionally include one or more cameras configured to capture movement of physical objects in the real-world environment. Image sensor(s) 210 also optionally include one or more depth sensors configured to detect the distance of physical objects from device 200. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 200 uses CCD sensors, event cameras, and depth sensors in combination to detect the physical environment around device 200. In some embodiments, image sensor(s) 210 include a first image sensor and a second image sensor. The first image sensor and the second image sensor work in tandem and are optionally configured to capture different information of physical objects in the real-world environment. In some embodiments, the first image sensor is a visible light image sensor, and the second image sensor is a depth sensor. In some embodiments, device 200 uses image sensor(s) 210 to detect the position and orientation of device 200 and/or display generation component(s) 224 in the real-world environment. For example, device 200 uses image sensor(s) 210 to track the position and orientation of display generation component(s) 224 relative to one or more fixed objects in the real-world environment.

In some embodiments, device 200 includes microphones(s) 218 or other audio sensors. Device 200 uses microphone(s) 218 to detect sound from the user and/or the real-world environment of the user. In some embodiments, microphone(s) 218 includes an array of microphones (a plurality of microphones) that optionally operate in tandem, such as to identify ambient noise or to locate the source of sound in space of the real-world environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real-world environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the computer-generated environment, relative to the display generation component(s) 224, and/or relative to another defined coordinate system. Eye tracking sensor(s) 232 are configured to track the position and movement of a user's gaze (eyes, face, or head, more generally) with respect to the real-world or computer-generated environment and/or relative to the display generation component(s) 224. In some embodiments, hand tracking sensor(s) 230 and/or eye tracking sensor(s) 232 are implemented together with the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s). In some embodiments, eye tracking sensor(s) 232 can use image sensor(s) 210 (e.g., one or more IR cameras, 3D cameras, depth cameras, etc.).

Device 200 is not limited to the components and configuration of FIG. 2, but can include fewer, other, or additional components in multiple configurations. A person using device 200, is optionally referred to herein as a user of the device.

As described herein, a computer-generated environment including various graphics user interfaces ("GUIs") may be displayed using an electronic device, such as computer system 100 or device 200, including one or more display generation components. The computer-generated environment can include one or more GUIs associated with an application.

In some embodiments, locations in a computer-generated environment (e.g., a three-dimensional environment, an XR environment, a mixed reality environment, etc.) optionally have corresponding locations in the physical environment. Thus, when a device is described as displaying a virtual object at a respective location with respect to a physical object (e.g., such as a location at or near the hand of the user, or at or near a physical table), the device displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment can interact with virtual objects that exist only in the three-dimensional environment. For example, a three-dimensional environment can include a table and a user interface located in front of the table, with the table being a view of (or a representation of) a physical table in the physical environment, and the user interface being a virtual object.

Similarly, a user is optionally able to interact with virtual objects in the three-dimensional environment (e.g., such as user interfaces of applications running on the device) using one or more hands as if the virtual objects were real objects in the physical environment. For example, as described above, one or more sensors of the device optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment (e.g., grabbing, moving, touching, pointing at virtual objects, etc.) as if they were real physical objects in the physical environment. In some embodiments, a user is able to move his or her hands to cause the representations of the hands in the three-dimensional environment to move in conjunction with the movement of the user's hand. As used herein, reference to a physical object such as hand can refer to either a representation of that physical object presented on a display, or the physical object itself as passively provided by a transparent or translucent display.

In some of the embodiments described below, the device is optionally able to determine the "effective" distance between physical objects in the physical world and virtual objects in the three-dimensional environment, for example, for the purpose of determining whether a physical object is interacting with a virtual object (e.g., whether a hand is touching, grabbing, holding, etc. a virtual object or within a threshold distance from a virtual object). For example, the device determines the distance between the hands of the user and virtual objects when determining whether the user is interacting with virtual objects and/or how the user is interacting with virtual objects. In some embodiments, the device determines the distance between the hands of the user and a virtual object by determining the distance between the location of the hands in the three-dimensional environment and the location of the virtual object of interest in the three-dimensional environment. For example, the one or more hands of the user can be located at a particular position in the physical world, which the device optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared against the position of the virtual object of interest in the three-dimensional environment to determine the distance between the one or more hands of the user and the virtual object. In some embodiments, the device optionally determines a distance between a physical object and a virtual object by comparing positions in the physical world (e.g., as opposed to comparing positions in the three-dimensional environment). For example, when determining the distance between one or more hands of the user and a virtual object, the device optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the device optionally performs any of the techniques described above to map the location of the physical object to the three-dimensional environment and/or map the location of the virtual object to the physical world.

In some embodiments, the same or similar technique is used to determine where and what the gaze of the user is directed to. For example, if the gaze of the user is directed to a particular position in the physical environment, the device optionally determines the corresponding position in the three-dimensional environment and if a virtual object is located at that corresponding virtual position, the device optionally determines that the gaze of the user is directed to that virtual object.

Similarly, the embodiments described herein may refer to the location of the user (e.g., the user of the device) and/or the location of the device in the three-dimensional environment. In some embodiments, the user of the device is holding, wearing, or otherwise located at or near the electronic device. Thus, in some embodiments, the location of the device is used as a proxy for the location of the user. In some embodiments, the location of the device and/or user in the physical environment corresponds to a respective location in the three-dimensional environment. In some embodiments, the respective location is the location from which the "camera" or "view" of the three-dimensional environment extends. For example, the location of the device would be the location in the physical environment (and its corresponding location in the three-dimensional environment) from which, if a user were to stand at that location facing the respective portion of the physical environment displayed by the display generation component, the user would see the objects in the physical environment in the same position, orientation, and/or size as they are displayed by the display generation component of the device (e.g., in absolute terms and/or relative to each other). Similarly, if the virtual objects displayed in the three-dimensional environment were physical objects in the physical environment (e.g., placed at the same location in the physical environment as they are in the three-dimensional environment, and having the same size and orientation in the physical environment as in the three-dimensional environment), the location of the device and/or user is the position at which the user would see the virtual objects in the physical environment in the same position, orientation, and/or size as they are displayed by the display generation component of the device (e.g., in absolute terms and/or relative to each other and the real world objects).

Some embodiments described herein may refer to selection inputs as either discrete inputs or as continuous inputs. For example, a selection input can correspond to a single selection input or a selection input can be held (e.g., maintained) while performing one or more other gestures or inputs. In some embodiments, a selection input can have an initiation stage, a holding stage, and a termination stage. For example, in some embodiments, a pinch gesture by a hand of the user can be interpreted as a selection input. In this example, the motion of the hand into a pinch position can be referred to as the initiation stage and the device is able to detect that the user has initiated a selection input. The holding stage refers to the stage at which the hand maintains the pinch position. Lastly, the termination stage refers to the motion of the hand terminating the pinch position (e.g., releasing the pinch). In some embodiments, if the holding stage is less than a predetermined threshold amount of time (e.g., less than 0.1 seconds, 0.3 seconds, 0.5 seconds, 1 second, 2 seconds, etc.), then the selection input is interpreted as a discrete selection input (e.g., a single event actuating a respective user interface element), such as a mouse click-and-release, a keyboard button press-and-release, etc. In such embodiments, the electronic device optionally reacts to the discrete selection event (e.g., optionally after detecting the termination). In some embodiments, if the holding stage is more than the predetermined threshold amount of time, then the selection input is interpreted as a select-and-hold input, such as a mouse click-and-hold, a keyboard button press-and-hold, etc. In such embodiments, the electronic device can react to not only the initiation of the selection input (e.g., initiation stage), but also to any gestures or events detected during the holding stage (e.g., such as the movement of the hand that is performing the selection gesture), and/or the termination of the selection input (e.g., termination stage).

Figure 3A:
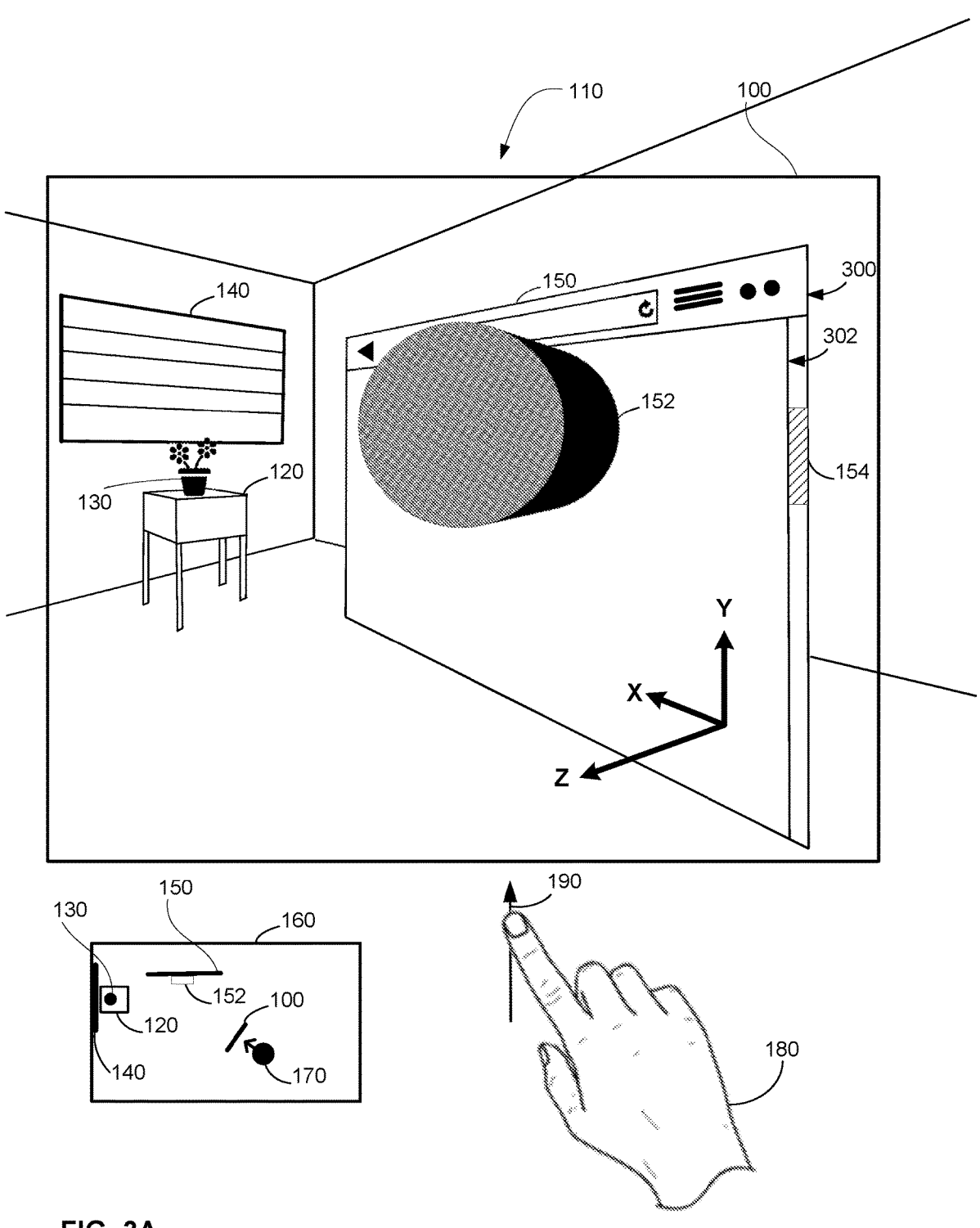
FIG. 3A illustrates three-dimensional content visually obscuring a portion of user interface in accordance with some embodiments of the disclosure.

FIG. 3A illustrates a browser user interface 150 including a content region 302 (e.g., also referred to herein as a "window" or "an application display region") and a navigation bar 300 (also referred to herein as a "chrome" or "chrome region"). In some embodiments, the navigation bar is displayed adjacent to the content region. Optionally the browser user interface 150 includes scrolling user interface element 154 to illustrate scrolling and/or a relative portion of the content shown in the content region 302. In some embodiments, as shown in FIG. 3A, the browser user interface 150 (e.g., navigation bar 300 and content region 302) is presented as a planar, two-dimensional object or a three-dimensional object with a planar, two-dimensional representation of the front face of the content region 302 and the front face of the navigation bar 300). The three-dimensional user interface object 152 can be presented on, against, and/or in front of a surface (e.g., front face) of the browser user interface 150, projecting into a forward projection volume (e.g., corresponding to forward projection volume 115 of FIG. 1B, not shown in FIG. 3A). FIG. 3A illustrates the three-dimensional user interface object 152 visually obscuring (e.g., obstructing) a portion of the browser user interface 150 (e.g., navigation bar 300) as can be seen from the viewpoint 170 (perspective) of the user. For example, in FIG. 3A, computer system 100 detects an input from hand 180 to scroll in an upwards direction 190 the content of the three-dimensional user interface object 152 such that three-dimensional user interface object 152 reaches to the top of the browser user interface 150. The position of the three-dimensional user interface object 152 at the top of the browser user interface 150 causes the navigation bar 300 to be partially obscured from the viewpoint 170 of the user. For example and as shown in FIG. 3A, user interface elements of navigation bar 300, such as the website entry field user interface element and navigation user interface elements (e.g., previous page and next page), are partially or fully hidden and thereby inaccessible to the user due to the obstructing three-dimensional user interface object 152. As described herein, the computer system 100 applies various visual treatments to the three-dimensional user interface object 152 and/or the browser user interface 150 in accordance with some embodiments. These visual treatments prevent the three-dimensional content from obscuring or reduce the amount of obstruction of portions the web browser for improved user experience (e.g., navigation user interface elements are visible and readily available for interaction). Additionally, application security can be improved by preventing content from content region 302 imitating the navigation bar. It should be appreciated, that although a navigation bar, such as navigation bar 300 in FIG. 3A located at the top edge is described, in some such embodiments, other user interfaces or containers (e.g., windows) located at any edge (or adjacent to) another window or user interface displaying three-dimensional content can be included in the user interface.

In some embodiments, the three-dimensional content projecting from the front face of the content region can be adjusted to reduce or eliminate the projection as it reaches the edge of the content region 302. However, in some embodiments, the visual treatment of reducing or eliminating the projection can be contrary to the desired three-dimensional display of content (full projection, but for the obstruction of the navigation bar 300).

Figure 3B:
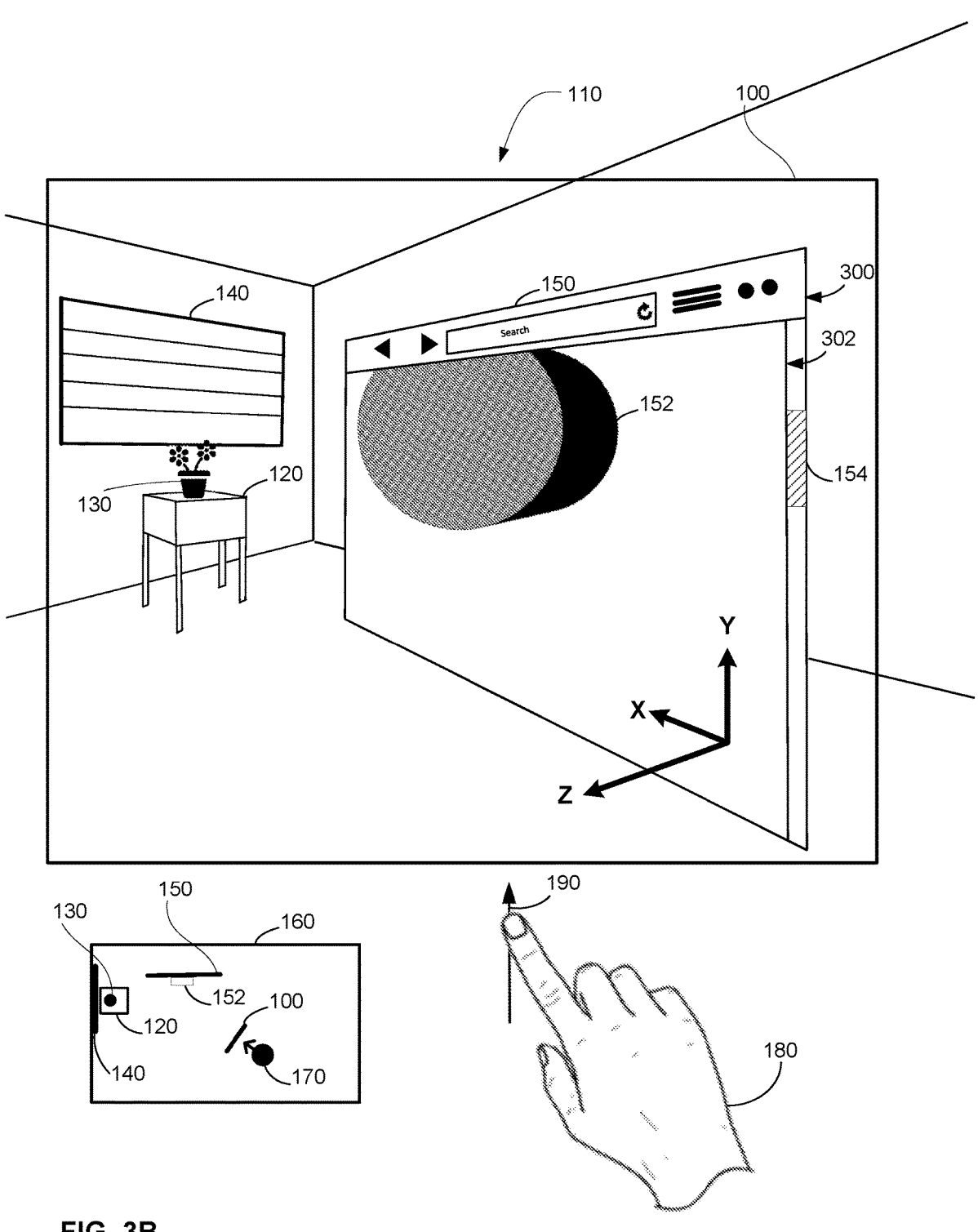
FIGS. 3B-3C illustrate one or more visual treatments applied to three-dimensional content in accordance with some embodiments of the disclosure.
Figure 3C:
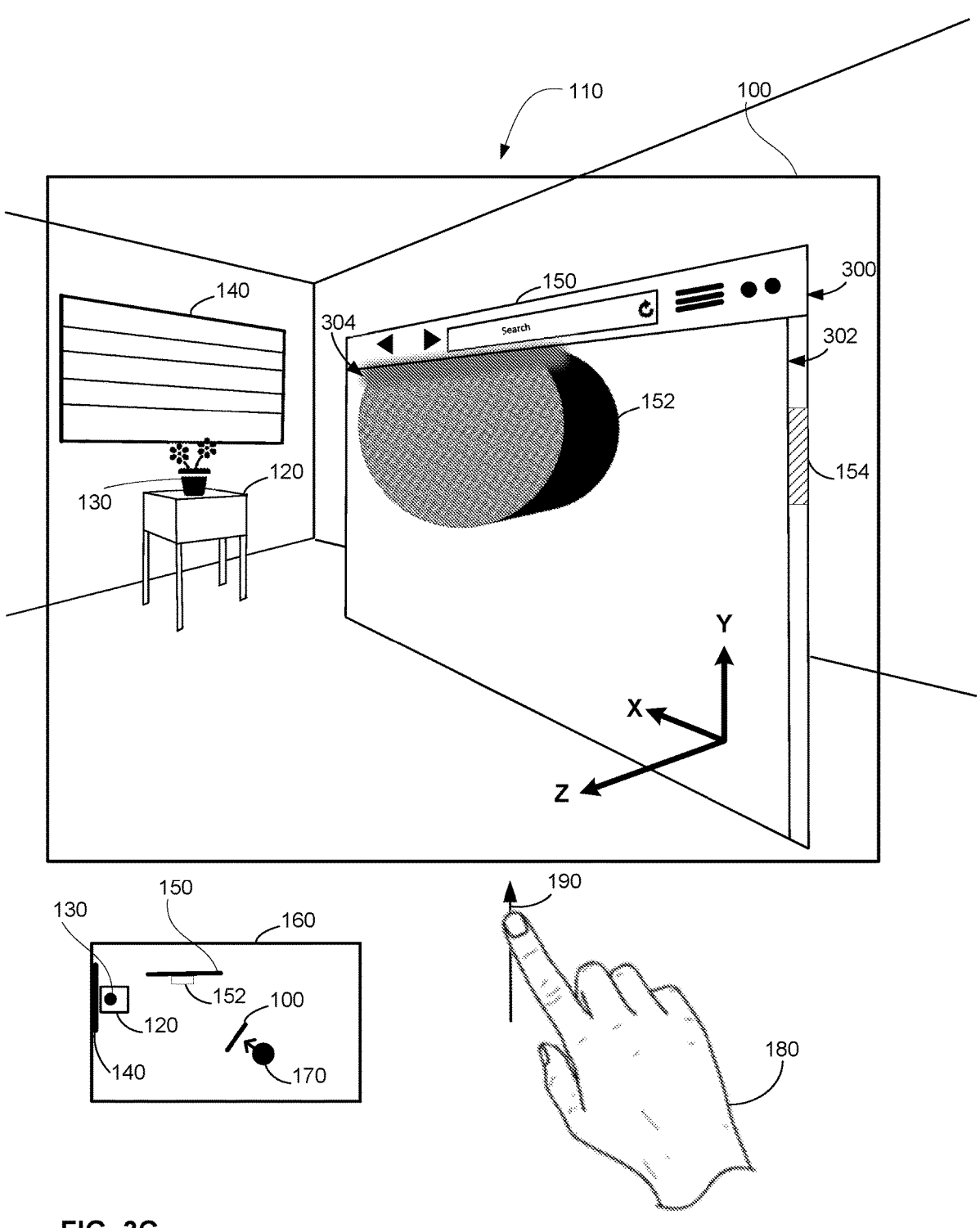
Figure 3D:
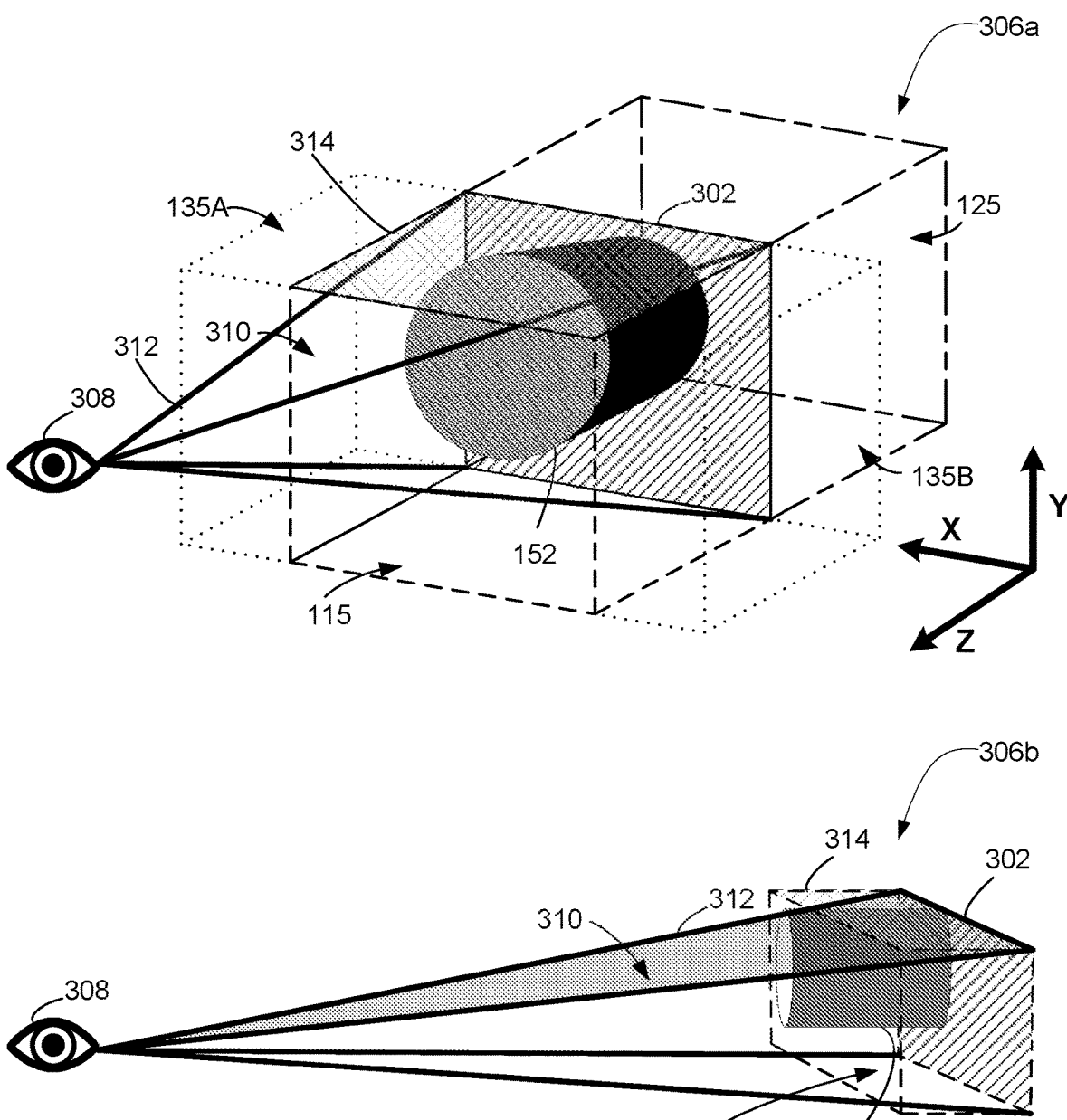
FIGS. 3D-3E illustrate one or more views of a user interface object configurable to display three-dimensional content according to some embodiments of the disclosure.

FIGS. 3B-3D illustrate one such visual treatment to the three-dimensional user interface object 152 to prevent the three-dimensional user interface object from obscuring portions of the browser user interface 150 according to some embodiments of the disclosure. FIG. 3B illustrates physical environment 110 (e.g., a computer-generated environment, an XR environment, etc.) that is being displayed (e.g., provided) by a display generation component of an electronic device (e.g., such as computer system 100 and/or device 200 described above with respect to FIG. 1A and FIG. 2).

In some embodiments, the user is able to interact with the browser user interface 150 using hand 180, as shown in FIG. 3B. In some embodiments, as described with reference to FIG. 3A, the browser user interface 150 is optionally presented as a two-dimensional object and the three-dimensional user interface object 152 can be presented on, against, and/or in front of a surface (e.g., front face) of the browser user interface 150. As described herein, because the three-dimensional user interface object 152 is a three-dimensional object and/or because the user is optionally able to move around in the physical environment 110 (e.g., by physical walking around in the real-world environment or moving computer system 100 in the real-world environment) and view the browser user interface 150 and the three-dimensional user interface object 152 from different angles and perspectives (e.g., from the side, from behind, from the top, etc.), the three-dimensional user interface object 152 may obscure a portion of the browser user interface 150 (e.g., navigation bar 300, scrolling user interface element 154, or other portions of the browser user interface outside the content region 302) without a visual treatment described herein. In some embodiments, the user is able to use one or more hands to scroll the three-dimensional user interface object 152 to a different location in the browser user interface 150 to reveal more content within the content region 302. For example, in some embodiments, the computer system 100 detects a hand gesture/input from the user of the computer system directed to one or more user interface objects of the browser user interface 150 to scroll the user interface objects within the browser user interface 150, and scrolls the user interface objects accordingly. In some embodiments, the input from the user includes a pinch gesture performed by a hand of the user detected by the computer system (e.g., on a touch sensitive surface or in free-space) while the attention (e.g., gaze) of the user is directed to scrolling user interface element 154 in the browser user interface. In some embodiments, the pinch gesture includes the index finger of the user and the thumb of the user coming together and touching, followed by movement of the hand (in a direction and/or with a magnitude) while maintaining the pinch gesture. The computer system 100 optionally scrolls scrolling user interface element 154 within the browser user interface with a magnitude and/or direction corresponding to the movement of the hand of the user (e.g., scrolls the scrolling user interface element 154 upward if the hand moves upward (or downwards), and scrolls the scrolling user interface element 154 downward if the hand moves downward (or upwards)). The input from the user optionally includes other types of inputs, such as trackpad inputs (e.g., finger touching the trackpad and moving in a direction and/or with a magnitude) or an input device input (e.g., movement of a handheld input device that detects direction and/or magnitude of movement of the input device while it is being held in the hand of the user). In some embodiments, the three-dimensional user interface object 152 is also scrolled with the same magnitude and/or direction corresponding to the scrolling user interface element 154. Thus, in some embodiments, the change in the position of the three-dimensional user interface object 152 relative to the viewpoint of the user results at least in part in obscuring or occluding part of the browser user interface 150.

In some embodiments, so as not to obscure the browser user interface 150, at least a portion of the three-dimensional user interface object 152 is clipped (e.g., is not shown) as illustrated in FIG. 3B. For example and in some embodiments, the computer system 100 detects the scrolling request to move the three-dimensional user interface object 152 towards a top (or other) boundary of the browser user interface 150. In some embodiments, the three-dimensional user interface object 152 is displayed as clipped when one or more visibility criteria are satisfied. In some embodiments, the one or more visibility criteria additionally or alternatively include a requirement that the three-dimensional user interface object 152 is at a location within a threshold distance (e.g., 0.1, 0.3, 0.5, 1, 3, or 5 cm) of the top (or other) boundary of the browser user interface 150. In some embodiments, the one or more visibility criteria additionally or alternatively include a requirement that the three-dimensional user interface object at the location includes a three-dimensional projection that, without applying a visual treatment as described herein, at least partially obscures a portion of the browser user interface 150 from the perspective of the user. In some embodiments, the one or more visibility criteria additionally or alternatively include a requirement that the three-dimensional user interface object at the location intersects one or more of a first plane (e.g., clipping plane, optionally orthogonal to the browser user interface 150 and separating the navigation bar 300 from the content region 302), such as first clipping plane 314 in FIG. 3D, or a second plane of a view volume defined by a direction and angle from the user's viewpoint 170, such as second clipping plane (or polygon) 312 of the view volume 310 in FIG. 3D. For example, the determination as to whether or not the three-dimensional perspective view of the three-dimensional user interface object 152 partially obscures a portion of the browser user interface 150 is based on whether either or both the first plane or the second plane intersects any portion of the three-dimensional user interface object 152 such that the portion of the three-dimensional user interface object 152 is determined to be outside the view volume and/or the forward projection volume 115 in a manner than obstructs another portion of the browser user interface 150 (e.g., navigation bar 300). In some embodiments, the portion determined to be outside the view volume and/or the forward projection volume 115 is determined to be potentially occluding and the computer system 100 cuts through the three-dimensional user interface object 152 at the associated intersection, creating a clipped (e.g., cutaway) view of three-dimensional user interface object 152, as displayed in FIG. 3B.

As shown in FIG. 3D, in some embodiments, the view volume 310 is represented by a pyramid bounded by five planes, such as four side (or lateral) planes including a top lateral plane, such as the clipping plane 312, and a base (or far) plane which optionally lies on the surface of the content region 302 of browser user interface 150 in FIG. 3D. In some embodiments, the four vertices at the base of the pyramid correspond to the four corners of the content region 302 and the edges (or line segments) connecting the four side planes of the pyramid correspond to rays extending from the corners of the content region 302 to the user viewpoint 308. Although, the view volume 310 is shown as a pyramid, it should be understood that any shape (e.g., cone, tube, rectangles, etc.) is obtained by the computer system and is updated based on changes of the user viewpoint 308. The top lateral plane, such as clipping plane 312 in FIG. 3D is dynamic and based on the user viewpoint 308 as compared to the first clipping plane 314 that remains fixed and is based on the size and orientation of the content region 302 (e.g., orthogonal to content region 302). As shown by 306b in FIG. 3D, the clipping plane 312 is lower in height relative to the first clipping plane 314. In some embodiments, the apex of the pyramid is at the position of the user viewpoint 308 and the view volume 310 is optionally defined as a 3D area that projects out from the position of the user viewpoint 308 along four line segments (or rays). In some embodiments, the line segments (e.g., edges connecting the four side planes of the pyramid shown in FIG. 3D) originate from the four corners of the content region 302 of the browser user interface 150. In some embodiments, the four side planes of the pyramid are optionally defined by the four corner points of the content region 302 of the browser user interface 150. In some embodiments, the view volume 310 is centered at the line of view of the user and extends in the x-direction, y-direction, and z-direction. Thus, in some embodiments, as the user moves around the physical environment 110, the view volume also changes relative to user viewpoint 308. In some embodiments, in an instance when the content region 302 is resized (e.g., made larger or smaller), thereby changing the location of the corner points (or reference points) of the content region 302, the view volume changes. In some embodiments, three-dimensional objects of the browser user interface 150 inside the view volume are displayed (can be seen) by the user and three-dimensional objects or portions of three-dimensional objects of the browser user interface 150 that are not in the view volume, such as a top portion of the three-dimensional user interface object 152 in FIG. 3D is clipped and cannot be seen. Turning back to FIG. 3B, as the three-dimensional user interface object 152 is moved towards the top of the content region 302 (e.g., moving towards the top of the view volume), it is bound by the view volume and as such, once the three-dimensional user interface object is within a threshold distance from the top of the content region 302 (or browser user interface 150), the computer system 100 determines the top portion of the three-dimensional user interface object 152 lies outside the view volume and is therefore clipped, cut away. As such, the navigation bar 300 is preserved and is not obscured by the three-dimensional user interface object 152.

In some embodiments, as the three-dimensional user interface object 152 is moved towards the top edge of the content region 302, the computer system 100 is configured to optionally cause the appearance of the three-dimensional user interface object 152 to change from a three-dimensional object to a two-dimensional object. For example, movement of the three-dimensional user interface object 152 towards the top edge of the content region 302 and adjacent to the navigation bar 300 optionally triggers a reduction of the three-dimensional appearance of the three-dimensional user interface object 152. Thus, in some embodiments, the computer system 100 displays the three-dimensional user interface object 152 at a location outside the threshold distance from the top edge of the content region 302 (or browser user interface 150) having its original three-dimensional appearance compared to when the three-dimensional user interface object 152 is at a location within the threshold distance from the top edge of the content region 302 and has a two-dimensional visual effect.

In some embodiments, applying the visual treatment further includes applying an appearance of an exterior surface onto a front face (e.g., in the z-direction) of the clipped three-dimensional content. For example, in some embodiments, the computer system 100 is configured to identify a second plane intersecting the content region 302 and the three-dimensional user interface object 152. The computer system 100 is further configured to present a first portion (e.g., clipped portion) of the three-dimensional user interface object 152 on a first (e.g., front-facing) side of the second plane without presenting a second portion (e.g., inner mesh) of the three-dimensional user interface object 152 on the first side of the second plane. The computer system is further configured to, is some examples, apply an appearance of an exterior surface of the clipped second portion of the three-dimensional user interface object 152 to the surface of the three-dimensional user interface object 152 at the second plane. In some embodiments, applying an appearance of an exterior surface optionally includes applying a filling technique or flattening technique such that instead of the user viewing into an empty inner mesh of the three-dimensional user interface object as a result of being clipped/cut at the second plane, the computer system 100 provides a visual appearance of flattening or filling the three-dimensional user interface object 152 with color and/or texture (e.g., corresponding to the exterior surface of the clipped second portion.

In some embodiments, the computer system 100 changes the visual appearance (e.g., applies a visual treatment) of the three-dimensional user interface object 152 and/or changes the visual appearance (e.g., applies a visual treatment) of the navigation bar 300, as shown in FIG. 3C. For example, a visual indication 304 that the three-dimensional user interface object 152 has been clipped and that a portion of the three-dimensional user interface object 152 is not displayed (hidden from the viewer). In some embodiments, visual indication 304 causes an edge of navigation bar 300 bordering content region 302 to be highlighted. In some embodiments, the visual indication 304 is displayed with full (or relatively high) visual prominence to ensure the user in apprised of the clipping of three-dimensional content. In some embodiments, the visual indications include a highlighted color with full or relatively high opacity (e.g., above a threshold, such as 60%, 70%, 75%, 80%, 85%, 90%, 95%, etc.). In some embodiments, other types of visual treatments may be applied to the three-dimensional user interface object 152 and/or the navigation bar 300, such as animations, illumination, blur, and/or the like.

Figure 3E:
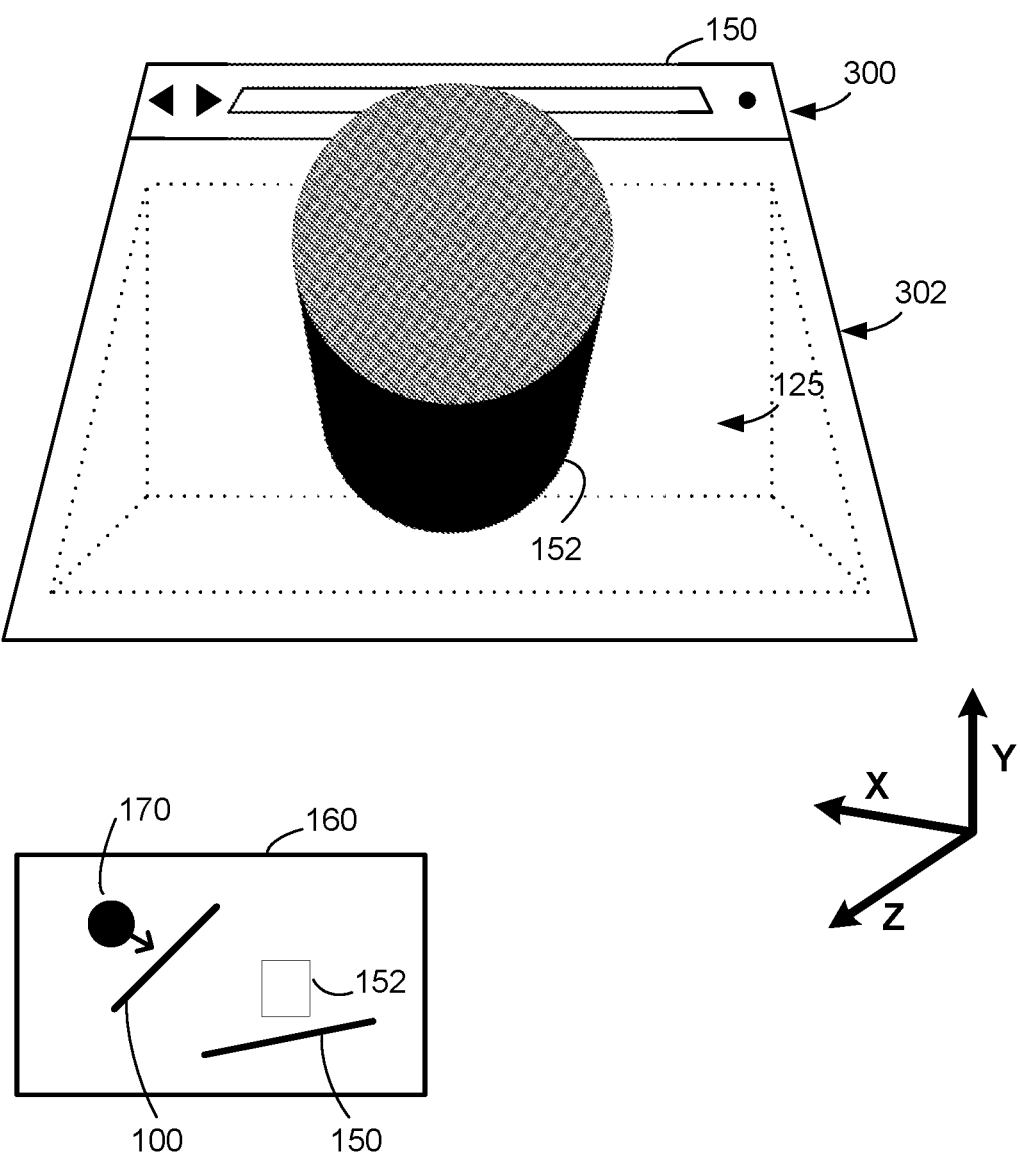

In some embodiments, the user can change position in the physical environment. For example, a user can "walk around" the three-dimensional preview to view the three-dimensional content from alternative perspectives and/or viewing angles. For example, the browser user interface 150 in FIG. 3A is presented from a different viewing angle than the viewing angle of the browser user interface in 306B of FIG. 3D. Additionally or alternatively, the computer system optionally presents the browser user interface 150 at different axial orientations (e.g., pitch, roll and/or yaw). For example, the browser user interface 150 in FIG. 3E is presented in a horizontal direction and the viewing angle is looking down at the browser user interface 150 according to the user's viewpoint 170 in overhead view 160. As such, presentation of the three-dimensional user interface object 152 relative to the user's viewpoint 170 results at least in part in obscuring or occluding a portion of the navigation bar 300 of the browser user interface 150 as shown in FIG. 3E.

FIG. 4 is a flowchart illustrating a method 400 of clipping at least a portion of a three-dimensional virtual object so as not to obscure the browser user interface 150 according to some embodiments of the disclosure. The method 400 is optionally performed at a computer system 100, when presenting three-dimensional virtual objects described above with reference to FIGS. 3A-3E. Some operations in method 400 are, optionally combined and/or order of some operations is, optionally, changed. At 402*a*, the method includes presenting, via the display, a user interface, such as browser user interface 150 of FIG. 3B, having a first user interface region, such as content region 302 of FIG. 3B, and a second user interface region, such as navigation bar 300 of FIG. 3B, from a viewpoint, such as viewpoint 170 of FIG. 3B. The first user interface region includes a user interface object at a first location of the first user interface region, such as the three-dimensional user interface object 152 located in a middle (or center) region of the content region 302. The user interface object has a three-dimensional visual effect. For example, the three-dimensional user interface object is presented projecting from (e.g., at a distance from or a degree of separation from) from the content region 302 (e.g., from the front face of the content region), a shadow, a degree of three-dimensional depth, a degree of specular highlighting, and/or having other three-dimensional properties. At 402*b*, the method includes, while presenting the user interface, receiving, via the one or more input devices, an input corresponding to a request to move the user interface object towards a boundary of the first user interface region. For example and as shown in FIG. 3B, the hand input 180 requesting to move the three-dimensional user interface object 152 in an upwards direction 190 towards the navigation bar 300. At 402*c*, the method includes, in response to detecting the input, moving the user interface object to a second location, different from the first location, in the first user interface region in accordance with the input as shown at 402*d*, such as moving the three-dimensional user interface object 152 towards the navigation bar 300 of the browser user interface 150. At 402*e*, the method includes, in accordance with a determination that the user interface object at the second location satisfies a set of one or more visibility criteria with respect to the second user interface region from the viewpoint, applying a first visual treatment to the user interface object, such as the first visual treatment of clipping at least a portion of the three-dimensional user interface object 152 in FIG. 3B. At 402*f*, the method includes, in accordance with a determination that the user interface object at the second location does not satisfy the one or more visibility criteria (e.g., corresponding to the user interface object not obstructing a view of navigation bar 300 from the viewpoint of the user), forgoing applying the first visual treatment to the user interface object.

Alternatively or additionally to one or more of the embodiments disclosed above, in some embodiments, the set of one or more visibility criteria include a criterion that is satisfied when the user interface object at the second location includes the three-dimensional visual effect that, without applying the first visual treatment, at least partially obscures a portion of the second user interface region from the viewpoint, such as the three-dimensional user interface object 152 partially obscuring a portion of the navigation bar 300 as shown in at least FIGS. 3A and 3E from two different perspectives (e.g., facing the back corner and in-between two walls of the physical environment in which computer system 100 is located in FIG. 3A and looking down at the browser user interface 150 in FIG. 3E). Alternatively or additionally to one or more of the embodiments disclosed above, in some embodiments, the method further comprises applying the first visual treatment to the user interface object according to a view volume, such as view volume 310 in FIG. 3D, from the viewpoint (e.g., user viewpoint 308 in FIG. 3D). Applying the first visual treatment optionally includes presenting a clipped user interface object at an intersection of the user interface object and a plane of the view volume (e.g., clipping plane 312) such that a portion of the user interface object outside the view volume is not presented. For example and as shown in FIG. 3D, a top portion of the three-dimensional user interface object 152 lies outside clipping plane 312 of view volume 310, and as such, the computer system is configured to clip the three-dimensional user interface object 152 at the intersection of the three-dimensional user interface object 152 and the clipping plane 312 so as to present a clipped representation of the three-dimensional user interface object 152 as shown in FIG. 3B. Alternatively or additionally to one or more of the embodiments disclosed above, in some embodiments, the user interface is associated with an instance of a web browser application, such as browser user interface 150 in FIG. 3B. Alternatively or additionally to one or more of the embodiments disclosed above, in some embodiments, the first user interface region is associated with a content region having the user interface object and includes content for a web page, such as content region 302 in FIG. 3B. Alternatively or additionally to one or more of the embodiments disclosed above, in some embodiments, the second user interface region is associated with a navigation region having an address bar and a plurality of affordances, such a navigation bar 300 in FIG. 3B. Alternatively or additionally to one or more of the embodiments disclosed above, in some embodiments, applying the first visual treatment to the user interface object includes presenting a first portion of the user interface object on a first side of the plane without presenting a second portion of the user interface object on the first side of the plane and applying an appearance of an exterior surface of the second portion of the user interface object to the exterior surface of the user interface object at the plane. For example, if the three-dimensional user interface object resembled a sphere-like object, clipping the sphere would not present a visual representation where a user may view inside the sphere, but instead the computer system optionally applies an appearance of the exterior surface of the sphere to the cut portion. In some embodiments, the computer system is configured to clip and fill the sphere. Alternatively or additionally to one or more of the embodiments disclosed above, in some embodiments, the one or more visibility criteria include a criterion that is satisfied when the user interface object at the second location intersects the plane of a view volume, such as view volume 310 in FIG. 3D defined by a direction and angle from the viewpoint, such as user viewpoint 308 in FIG. 3D. Alternatively or additionally to one or more of the embodiments disclosed above, in some embodiments, the method further comprises in accordance with the determination that the user interface object at the second location satisfies the set of one or more visibility criteria, applying a second visual treatment to the user interface object, such as visual indication 304 in FIG. 3C or applying the second visual treatment to the boundary of the first user interface region, wherein the second visual treatment comprises highlighting.

Some embodiments of the disclosure are directed to an electronic device, comprising one or more processors, memory, and one or more programs. The one or more programs are stored in the memory and configured to be executed by the one or more processors, the one or more programs including instructions for presenting, via the display, a user interface having a first user interface region and a second user interface region from a viewpoint. The first user interface region includes a user interface object at a first location of the first user interface region, and the user interface object having a three-dimensional visual effect. The one or more programs further including instructions for, while presenting the user interface, receiving, via the one or more input devices, an input corresponding to a request to move the user interface object towards a boundary of the first user interface region. The one or more programs further including instructions for, in response to detecting the input, moving the user interface object to a second location, different from the first location, in the first user interface region in accordance with the input. The one or more programs further including instructions for, in accordance with a determination that the user interface object at the second location satisfies a set of one or more visibility criteria with respect to the second user interface region from the viewpoint, applying a first visual treatment to the user interface object, and in accordance with a determination that the user interface object at the second location does not satisfy the one or more criteria, forgoing applying the first visual treatment to the user interface object.

Some embodiments of the disclosure are directed to a non-transitory computer readable storage medium storing one or more programs. The one or more programs comprising instructions, which when executed by one or more processors of an electronic device, cause the electronic device to present, via the display, a user interface having a first user interface region and a second user interface region from a viewpoint. The first user interface region includes a user interface object at a first location of the first user interface region, and the user interface object having a three-dimensional visual effect. The one instructions, when executed by the one or more processors of the electronic device, further cause the electronic device to, while presenting the user interface, receive, via the one or more input devices, an input corresponding to a request to move the user interface object towards a boundary of the first user interface region, and in response to detecting the input, move the user interface object to a second location, different from the first location, in the first user interface region in accordance with the input. The one instructions, when executed by the one or more processors of the electronic device, further cause the electronic device to, in accordance with a determination that the user interface object at the second location satisfies a set of one or more visibility criteria with respect to the second user interface region from the viewpoint, apply a first visual treatment to the user interface object, and in accordance with a determination that the user interface object at the second location does not satisfy the one or more criteria, forgo applying the first visual treatment to the user interface object.

Some embodiments of the disclosure are directed to an information processing apparatus for use in an electronic device, the information processing apparatus comprising means for presenting, via the display, a user interface having a first user interface region and a second user interface region from a viewpoint. The first user interface region includes a user interface object at a first location of the first user interface region, the user interface object having a three-dimensional visual effect. The information processing apparatus further comprising means for, while presenting the user interface, receiving, via the one or more input devices, an input corresponding to a request to move the user interface object towards a boundary of the first user interface region, and means for, in response to detecting the input, moving the user interface object to a second location, different from the first location, in the first user interface region in accordance with the input. The information processing apparatus further comprising means for: in accordance with a determination that the user interface object at the second location satisfies a set of one or more visibility criteria with respect to the second user interface region from the viewpoint, applying a first visual treatment to the user interface object, and in accordance with a determination that the user interface object at the second location does not satisfy the one or more criteria, forgoing applying the first visual treatment to the user interface object.

Figure 5A:
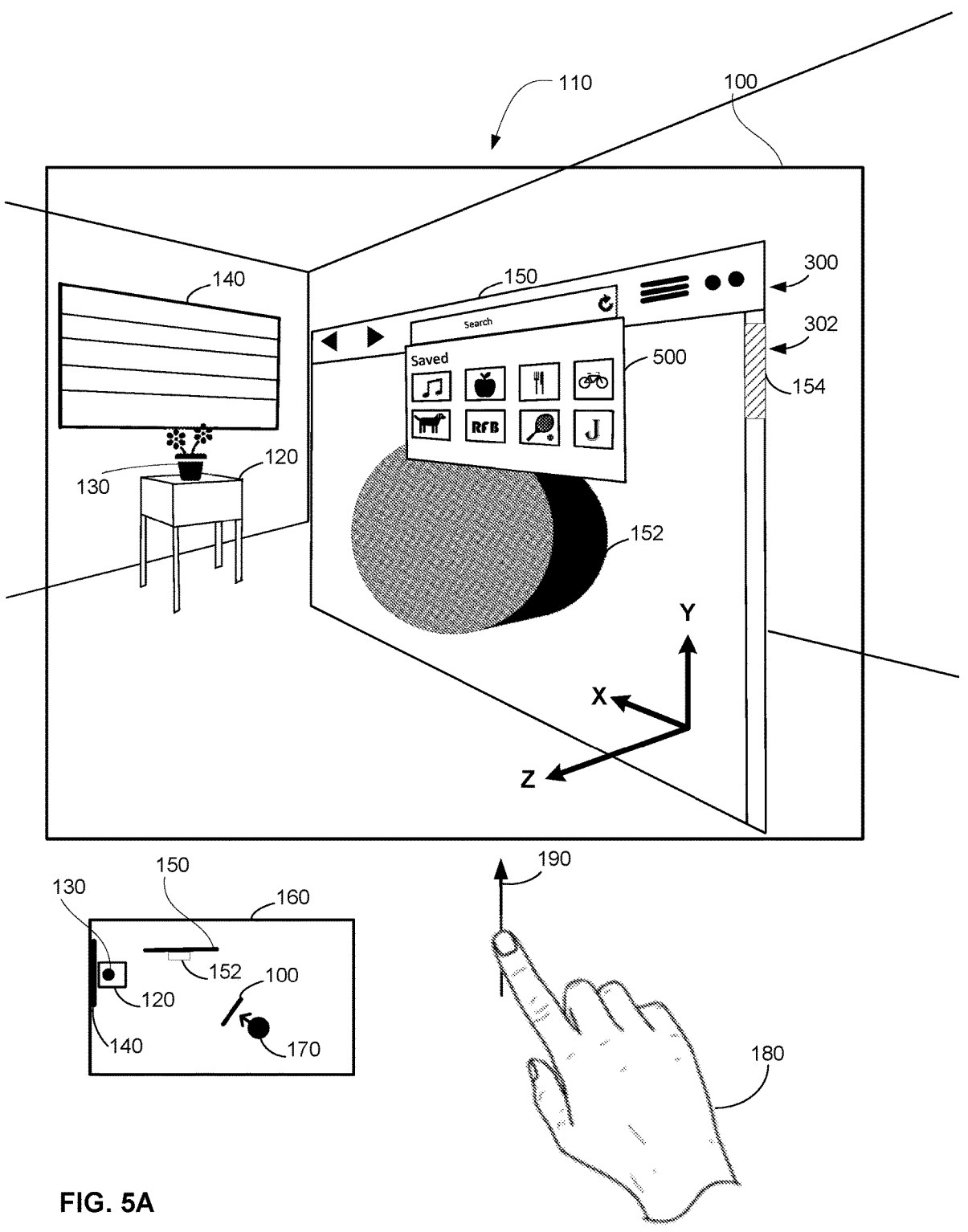
FIG. 5A illustrates a visual treatment applied to three-dimensional content in accordance with some embodiments of the disclosure.

FIG. 5A illustrates a method of another visual treatment to the three-dimensional user interface object 152 to prevent the three-dimensional user interface object from obscuring portions of the browser user interface 150 according to some embodiments of the disclosure. In some embodiments, so as not to obscure the browser user interface 150, the computer system 100 is configured to cause the three-dimensional user interface object 152 to recede backward (e.g., in z-depth) in the browser user interface 150 using a rear projection volume, as shown in FIG. 5A. The rear projection volume can be thought of as a digital equivalent of a diorama, in which the front face of content region 302 represents the front face of a volume representing the content region 302. Rather than the three-dimensional user interface object 152 projecting forward from the front face, the three-dimensional user interface object 152 can recede backward into the rear projection volume and project forward from there. In some embodiments, the interior of the rear projection region can be textured (e.g., with color, pattern, materials, etc.). For example and in some embodiments, the computer system 100 detects the scrolling request to move the three-dimensional user interface object 152 towards a top (or other) boundary of the browser user interface 150 (e.g., as described above with reference to FIG. 3A). Additionally or alternatively, in some embodiments, the computer system 100 detects an input causing the display of a modal window 500 (e.g., a two-dimensional modal window) in FIG. 5A. In some embodiments, when one or more visibility criteria are satisfied, the three-dimensional content can be pushed back into the rear projection volume to avoid obscuring the modal window and/or the chrome. In some embodiments, the one or more visibility criteria include a criterion that is satisfied when that the three-dimensional user interface object 152 is at a location within a threshold distance (e.g., 0.1, 0.3, 0.5, 1, 3, 5, 10, 20, 50 or 100 cm) of the top (or other) boundary of the browser user interface 150 (e.g., such that the three-dimensional user interface object 152 may obstruct view of the chrome and/or modal window). Additionally or alternatively, in some embodiments, the one or more visibility criteria include a criterion that is satisfied when the three-dimensional user interface object 152 at the location includes a three-dimensional perspective view that, without applying a visual treatment as described herein, at least partially obscures a portion of the browser user interface 150. Additionally or alternatively, in some embodiments, the one or more visibility criteria include a criterion that is satisfied when the three-dimensional user interface object 152 at the location intersects one or more of the first plane (e.g., clipping plane) or the second plane of the view volume defined by the direction and the angle from the user's viewpoint 170, as described in method 400.

Figure 5B:
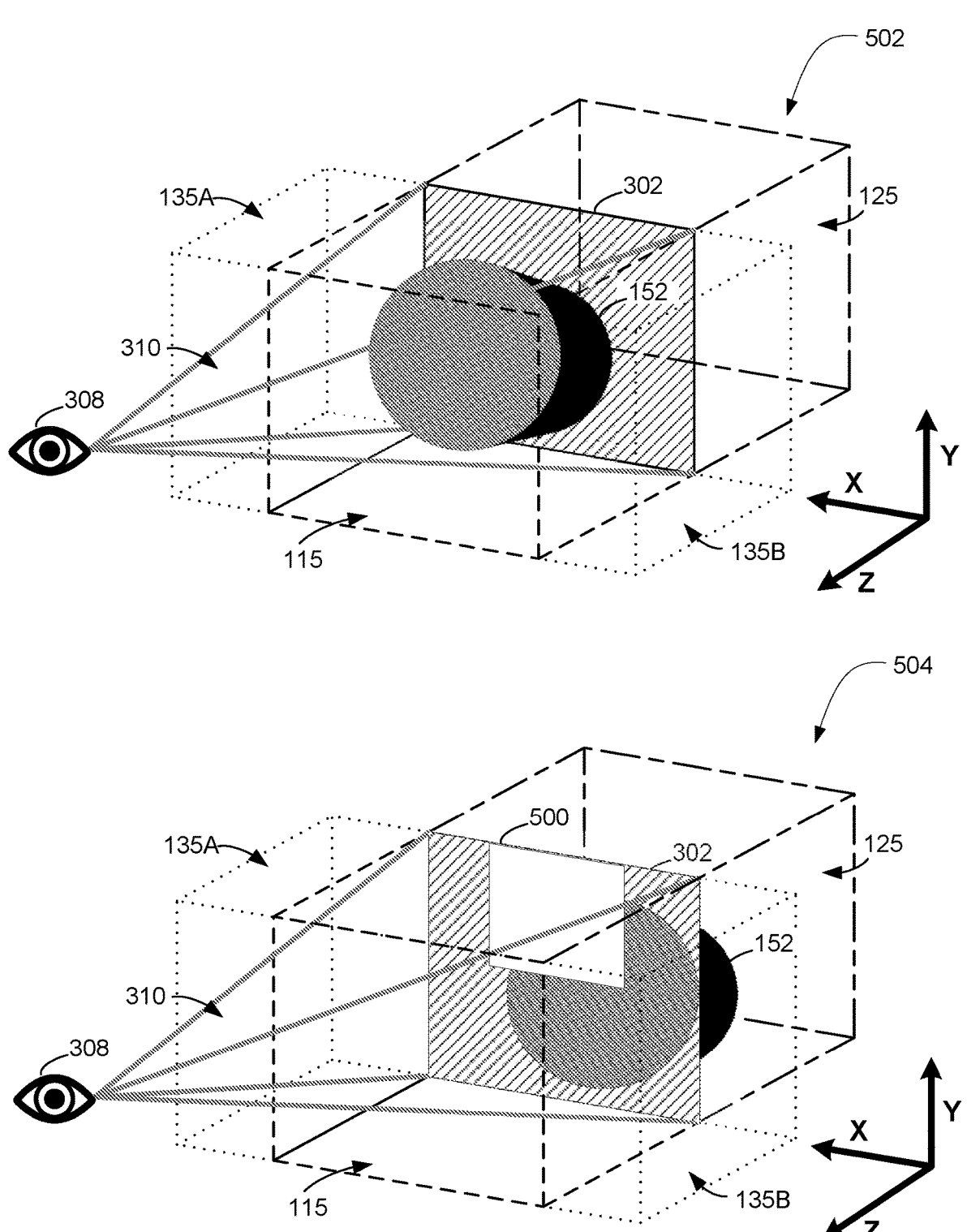
FIG. 5B illustrates a view of a user interface object configurable to display three-dimensional content according to some embodiments of the disclosure.

In some embodiments, as the three-dimensional user interface object 152 is moved towards the top of the content region 302 as shown in FIG. 5A (e.g., moving towards the top of the view volume, such as view volume 310 in FIG. 5B) a visual treatment can be applied to avoid three-dimensional user interface object 152 obscuring the navigation bar 300. In some embodiments, once the three-dimensional user interface object is detected within a threshold distance from the top of the browser user interface 150, the computer system 100 determines the top portion of the three-dimensional user interface object 152 lies outside the view volume (or potentially outside the view volume) as shown by view 502 in FIG. 5B and therefore presents a two-dimensional window along the first plane, such as modal window 500 depicted in view 504 in FIG. 5B. In some embodiments, the computer system presents the two-dimensional window along the first plane flush with the surface of the browser user interface 150. In some embodiments, the modal window may appear invisible or have a translucent visual appearance. The presentation of the two-dimensional window such as modal window 500 causes the three-dimensional user interface object 152 to be pushed back into a rear projection volume as depicted in view 504 in FIG. 5B. In some embodiments, the three-dimensional user interface object 152 being pushed back into the rear projection volume (e.g., at a depth of the content region 302 or further from the computer system than the content region 302 when the three-dimensional user interface object 152 reaches the top boundary of the content region 302) as depicted in view 504 in FIG. 5B does not satisfy the one or more visibility criteria. In some embodiments, the depth is selected such that moving the three-dimensional user interface object 152 at a location closer to the computer system causes the three-dimensional user interface object 152 to satisfy the one or more visibility criteria. In some embodiments, the browser user interface 150 is associated with the rear projection volume (e.g., three-dimensional box corresponding to rear projection volume 125 in FIG. 5B), wherein three-dimensional content is pushed back into the rear projection volume. In some embodiments, the rear projection volume is located behind (e.g., in negative z-direction) the browser user interface 150. In some embodiments, the computer system 100 is configured to generate the rear projection volume associated with the browser user interface 150 based on the size (e.g., length and width) of the content region 302 of the browser user interface 150. In some embodiments, the negative z-depth value of the rear projection volume is a predetermined value. Additionally or alternatively, the negative z-depth value is based on the three-dimensional depth of the three-dimensional user interface object 152 such that the computer system is configured to cause the three-dimensional user interface object 152 to be pushed back (e.g., in negative z-direction) into the rear projection volume in a distance amount corresponding to the three-dimensional depth of the three-dimensional user interface object 152. Additionally or alternatively, the three-dimensional user interface object 152 is pushed back far enough into the rear projection volume 125 that no portions of the three-dimensional user interface object 152 intersect with the browser user interface 150 (e.g., the far clipping plane which optionally lies on the surface of the content region 302 as shown in FIG. 5B) and/or any portions of the three-dimensional user interface object 152 are inside the rear projection volume 125. In some embodiments, the three-dimensional content appears to be placed inside the digital diorama (e.g., rear projection volume 125).

FIG. 6 is a flowchart illustrating a method 600 of causing a three-dimensional virtual object to recede backward (e.g., in z-depth) in the browser user interface 150 using a rear projection volume according to some embodiments of the disclosure. The method 600 is optionally performed at a computer system 100, when presenting three-dimensional virtual objects described above with reference to FIGS. 5A-5B. Some operations in method 600 are, optionally, combined and/or order of some operations is, optionally, changed. At 602a, the method includes presenting, via the display, a user interface having a first user interface region and a second user interface region. The first user interface region includes a user interface object at a first location within a plane of the first user interface region at a first depth (or degree of separation from the plane of the first user interface region). The user interface object has a three-dimensional visual effect projecting from the plane of the first user interface region (e.g., having a depth or degree of separation (or distance) from the content region 302 so as to project outwards toward the user). At 602b, the method includes, while presenting the user interface, receiving, via the one or more input devices, an input corresponding to a request to move the user interface object towards a boundary of the first user interface region, such as a top boundary separating the first user interface region and the second user interface region. At 602c, the method includes, in response to detecting the input, moving the user interface object to a second location, different from the first location, in the first user interface region in accordance with the input as shown at 602d. For example and as shown in FIG. 5A, a hand input is detected by the computer system corresponding with a request to move in an upwards direction 190 the three-dimensional user interface object 152 from the first location to the second location above the first location (e.g., towards a top boundary of the content region and closer to the navigation bar 300). At 602e, the method includes, in accordance with a determination that the user interface object at the second location at the first depth satisfies a set of one or more visibility criteria (e.g., a criterion that is satisfied when the three-dimensional user interface object

152 at the second location includes a three-dimensional perspective view that, without presenting the user interface object at the second depth further from the computer system than the first depth, at least partially obscures a portion of the browser user interface 150), presenting, via the display, the user interface object at a second depth further from the computer system than the first depth. For example and as shown in FIGS. 5A and 5B, the computer system causes the three-dimensional user interface object 152 to be pushed back into a rear project volume 125. At 602_f_, the method includes, in accordance with a determination that the user interface object at the second location at the first depth does not satisfy the one or more visibility criteria, presenting the user interface object at the first depth.

Alternatively or additionally to one or more of the embodiments disclosed above, in some embodiments, the set of one or more visibility criteria include a criterion that is satisfied when the user interface is configurable to include a modal user interface configured to cause the user interface object to recede backward in the user interface relative to a view volume from a viewpoint, such as modal user interface window 500 in FIGS. 5A and 5B. Alternatively or additionally to one or more of the embodiments disclosed above, in some embodiments, the user interface is associated with an instance of a web browser application. Alternatively or additionally to one or more of the embodiments disclosed above, in some embodiments, the first user interface region is associated with a content region having the user interface object and includes content for a web page. Alternatively or additionally to one or more of the embodiments disclosed above, in some embodiments, the second user interface region is associated with a navigation region having an address bar and a plurality of affordances. Alternatively or additionally to one or more of the embodiments disclosed above, in some embodiments, the set of one or more visibility criteria include a criterion that is satisfied when the user interface object at the second location includes the three-dimensional visual effect that, without presenting the user interface object at the second depth further from the computer system than the first depth, at least partially obscures a portion of the second user interface region from a viewpoint. Alternatively or additionally to one or more of the embodiments disclosed above, in some embodiments, the user interface object at the second location at the second depth does not satisfy the one or more visibility criteria. Alternatively or additionally to one or more of the embodiments disclosed above, in some embodiments, the second depth is selected such that moving the user interface object at the second location closer to the computer system from the second depth causes the user interface object at the second location to satisfy the set of one or more criteria. Alternatively or additionally to one or more of the embodiments disclosed above, in some embodiments, the second depth is at a depth of the first user interface region or further from the computer system than the first user interface region when the object reaches the boundary of the first user interface region.

Some embodiments of the disclosure are directed to an electronic device, comprising one or more processors, memory, and one or more programs. The one or more programs are stored in the memory and configured to be executed by the one or more processors. The one or more programs including instructions for presenting, via the display, a user interface having a first user interface region and a second user interface region. The first user interface region includes a user interface object at a first location within a plane of the first user interface region at a first depth, the user interface object having a three-dimensional visual effect projecting from the plane of the first user interface region. The one or more programs further including instructions for, while presenting the user interface, receiving, via the one or more input devices, an input corresponding to a request to move the user interface object towards a boundary of the first user interface region, and in response to detecting the input, moving the user interface object to a second location, different from the first location, in the first user interface region in accordance with the input. The one or more programs further including instructions for, in accordance with a determination that the user interface object at the second location satisfies a set of one or more visibility criteria, presenting, via the display, the user interface object at a second depth further from the user than the first depth, and in accordance with a determination that the user interface object at the second location does not satisfy the one or more criteria, presenting the user interface object at the first depth.

Some embodiments of the disclosure are directed to a non-transitory computer readable storage medium storing one or more programs. The one or more programs comprising instructions, which when executed by one or more processors of an electronic device, cause the electronic device to present, via the display, a user interface having a first user interface region and a second user interface region. The first user interface region includes a user interface object at a first location within a plane of the first user interface region at a first depth, the user interface object having a three-dimensional visual effect projecting from the plane of the first user interface region. The one instructions, when executed by the one or more processors of the electronic device, further cause the electronic device to, while presenting the user interface, receive, via the one or more input devices, an input corresponding to a request to move the user interface object towards a boundary of the first user interface region, and in response to detecting the input, move the user interface object to a second location, different from the first location, in the first user interface region in accordance with the input. The one instructions, when executed by the one or more processors of the electronic device, further cause the electronic device to, in accordance with a determination that the user interface object at the second location satisfies a set of one or more visibility criteria, present, via the display, the user interface object at a second depth further from the user than the first depth, and in accordance with a determination that the user interface object at the second location does not satisfy the one or more criteria, present the user interface object at the first depth.

Some embodiments of the disclosure are directed to an information processing apparatus for use in an electronic device, the information processing apparatus comprising means for presenting, via the display, a user interface having a first user interface region and a second user interface region. The first user interface region includes a user interface object at a first location within a plane of the first user interface region at a first depth, the user interface object having a three-dimensional visual effect projecting from the plane of the first user interface region. The information processing apparatus further comprising means for, while presenting the user interface, receiving, via the one or more input devices, an input corresponding to a request to move the user interface object towards a boundary of the first user interface region, and means for, in response to detecting the input, moving the user interface object to a second location, different from the first location, in the first user interface region in accordance with the input. The information processing apparatus further comprising, means for, in accordance with a determination that the user interface object at the second location satisfies a set of one or more visibility criteria, presenting, via the display, the user interface object at a second depth further from the user than the first depth, and in accordance with a determination that the user interface object at the second location does not satisfy the one or more criteria, presenting the user interface object at the first depth.

Figure 7A:
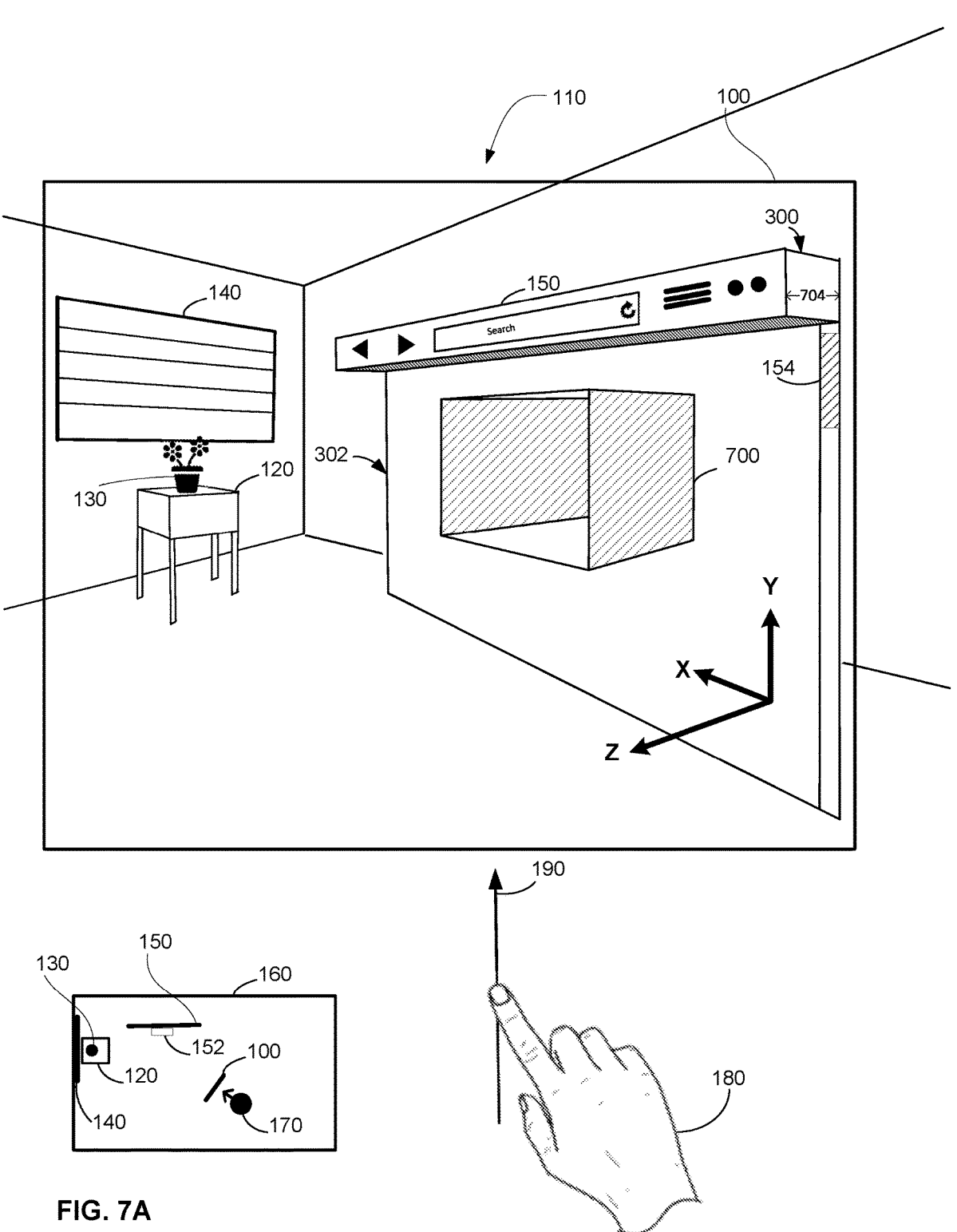
FIGS. 7A-7C illustrate one or more visual treatments applied to the user interface in accordance with some embodiments of the disclosure.
Figure 7B:
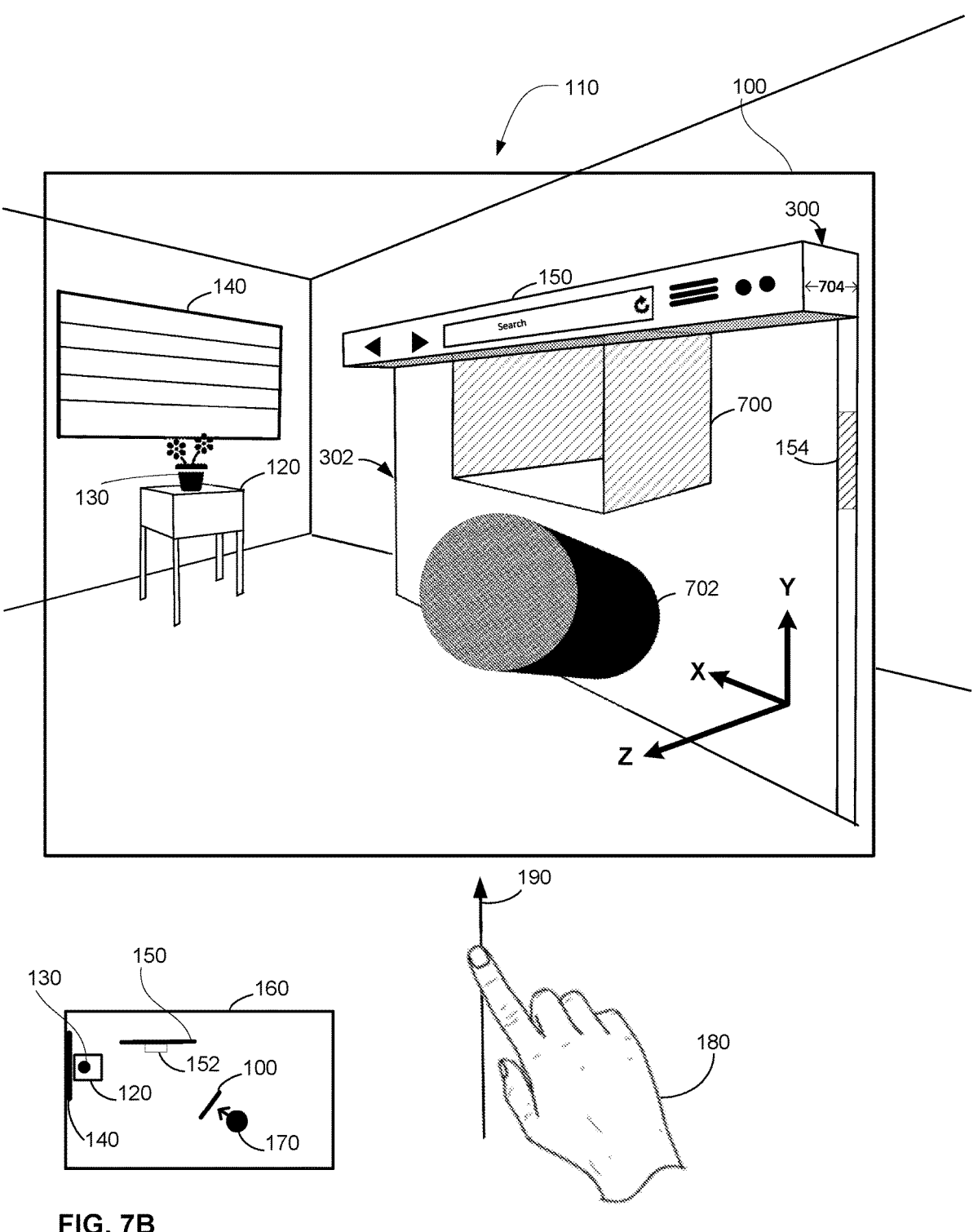
Figure 7C:
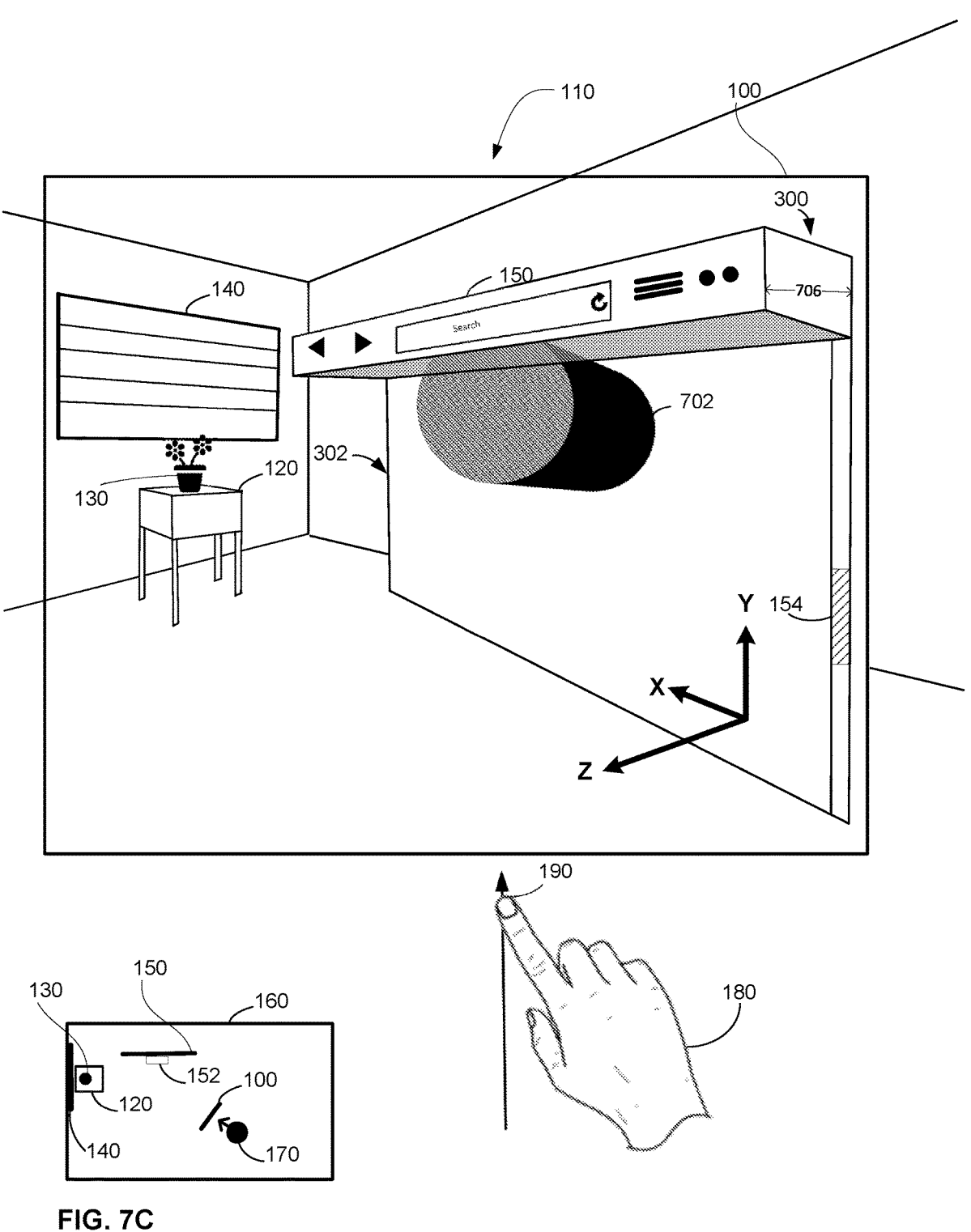

Referring back to visual treatment applied in FIGS. 3B-3C and 5, the front face of browser user interface 150 remains stationary with the three-dimensional environment and the three-dimensional content is projected into a forward projection volume or is pushed back into a rear projection volume and projects forward from the rear projection volume. In some embodiments, the front face of the chrome and the front face of the content region can be offset in the three-dimensional environment (e.g., at different depths along the z-dimension). FIGS. 7A-7C illustrate a method of applying a visual treatment to the browser user interface 150 to prevent the three-dimensional user interface object from obscuring portions of the browser user interface 150 according to some embodiments of the disclosure. In some embodiments, so as not to obscure the navigation bar 300 of the browser user interface 150, the computer system 100 is configured to present the navigation bar 300 (e.g., a front face of navigation bar 300) offset from the content region 302 (e.g., a front face of content region 302) such that the navigation bar 300 is presented at a z-depth closer to the user than the z-depth of the content region 302 further from the user. The offset provides the visual appearance that navigation bar 300 projected forward in the z-direction relative to content region 302, as shown in FIG. 7A. In some embodiments, the offset can provide room for three-dimensional content projecting from content region 302 (e.g., into a forward projection region) to remain three-dimensional without obscuring navigation bar 300. For example, the computer system 100 presents the navigation bar 300 offset from the content region 302 (e.g., the navigation bar 300 is presented at a depth closer to the user's viewpoint than the depth of the content region 302). The amount of the offset can be represented by depth 704. In some embodiments, the navigation bar can be presented as a three-dimensional object with the rear face of navigation bar 300 in the plane of the front face of content region 302. In some embodiments, the space between the front face of navigation bar 300 and the back face of navigation bar 300 can be empty/hollow, such that the three-dimensional content may be partially visible from certain user perspectives within the hollow region between the front and rear faces of the three-dimensional chrome.

In some embodiments, the offset corresponds to a predetermined amount of offset that is selected to overcome the possibility of three-dimensional objects obscuring the navigation bar 300. In some embodiments, the predetermined amount can be predetermined for a webpage based on the content of the webpage. For example, the predetermined amount can be equal to (or greater than) the maximum projection distance of three-dimensional content for the webpage. In some embodiments, the predetermined amount can be the same for all webpages without consideration of the maximum projection distance of the three-dimensional content. In some embodiments, the predetermined amount can be capped such that the offset of the navigation bar relative to the content region cannot exceed the cap. In some such embodiments, three-dimensional content that projects more than the predetermined amount can be subject to additional visual effects to avoid obstructing the chrome (e.g., clipping, optionally with a visual indication, as described with reference to FIGS. 3B-3C, pushing back the three-dimensional content in the rear projection volume as described with reference to FIG. 5A, etc.)

In some embodiments, the amount of the offset is dynamic based different types of content to be displayed in content region 302. For example, the amount of offset may be different for a the first three-dimensional visual effect of the first user interface object (e.g., a first projection amount for a first three-dimensional object) and the second three-dimensional visual effect of the second user interface object (e.g., a second projection amount for a second three-dimensional object, different than the first projection amount) as described with reference to FIG. 7B. FIG. 7B illustrates an alternative embodiment for presenting the navigation bar 300 offset from the content region 302. FIG. 7B illustrates a webpage including multiple three-dimensional objects including a first three-dimensional object that projects a first amount and a second three-dimensional object that projects a second amount different than the first amount. In the embodiment of FIG. 7B, the computer system 100 detects the scrolling request to move the three-dimensional user interface object 700 towards a top (or other) boundary of the browser user interface 150. In some embodiments, the computer system 100 is configured to determine the three-dimensional visual effect of the three-dimensional user interface object 700, wherein the three-dimensional visual effect of the three-dimensional user interface object 700 corresponds to a degree of three-dimensional depth of the three-dimensional user interface object 700 (e.g., the amount of projection). As such, the computer system 100 is configured to present the navigation bar 300 at a depth 704 based on the three-dimensional depth of the three-dimensional user interface object 700 to prevent the three-dimensional user interface object 700 from obscuring portions of the navigation bar 300 as illustrated in FIG. 7B.

In some embodiments, scrolling the three-dimensional user interface object 700 in the upwards direction 190 using hand 180 reveals an additional three-dimensional user interface object 702 at the bottom of the browser user interface 150. In some embodiments, the computer system is configured to present the navigation bar 300 offset from the content region 302, wherein the amount of offset is based on the three-dimensional user interface object 702, as shown in FIG. 7C, and wherein the amount of offset is different for three-dimensional user interface object 702 than for three-dimensional user interface object 700.

For example, as shown in FIG. 7C, in response to receiving the input to scroll the browser user interface 150, the computer system 100 scrolls the three-dimensional user interface object 702 in an upwards direction 190 towards the top boundary of the browser user interface 150. In some embodiments, in response to receiving the input to scroll the browser user interface 150, the computer system 100 displays the three-dimensional user interface object 702 at different locations in FIG. 7C compared with the locations of these objects in FIG. 7B. For example, FIG. 7C shows the location of the three-dimensional user interface object 702 even closer to the top boundary of the browser user interface 150 than in FIG. 7B. In response, the computer system 100 is configured to determine the three-dimensional visual effect of the three-dimensional user interface object 702, wherein the three-dimensional visual effect of the three-dimensional user interface object 702 corresponds to a degree of three-dimensional depth of the three-dimensional user interface object 702. As such, the computer system 100 is configured to present the navigation bar 300 at a depth 706 (different than depth 704) based on the three-dimensional depth of the three-dimensional user interface object 702 (different than the three-dimensional depth of three-dimensional user interface object 700) to prevent the three-dimensional user interface object 702 from obscuring portions of the navigation bar 300 as illustrated in FIG. 7C. In some embodiments, the navigation bar 300 has (e.g., is displayed with) a depth 706 different from a depth 704 as shown in FIG. 7B (e.g., greater than, less than).

It is understood that, in some embodiments, when two-dimensional content is shown at or near (within a threshold distance) of the top edge of content region 302, the offset between the navigation bar 300 and content region 302 can be reduced or eliminated. In some embodiments, the change in the offset can be gradual to avoid drastic changes in the position of the chrome relative to the content region. In some embodiments, hysteresis can be applied to the amount of offset to avoid changing the offset drastically due to changes in the projection amount of different content. In some embodiments, the projection amount (e.g., three-dimensional depth) of an object can be computed as a single value for an object (e.g., the maximum projection, average projection, etc.). In some embodiments, the projection amount (e.g., three-dimensional depth) of an object can be computed as a function of position and the offset can change dynamically depending on the projection amount of the portion of the object near a boundary of content region 302. It is understood that although primarily described as an offset of the navigation bar projecting forward from the front face of the content region (e.g., where the content region remains stationary), that a similar visual effect can be achieved by the content region being offset relative to the front face of the chrome (e.g., pushing back the content region and associated content, whereas the chrome remains stationary). In some embodiments, the offset can be achieved by partially moving the chrome forward and partially moving the content region backward.

FIG. 8 is a flowchart illustrating a method 800 of presenting the navigation bar 300 offset from the content region 302 according to some embodiments of the disclosure. The method 800 is optionally performed at a computer system 100, when presenting three-dimensional virtual objects described above with reference to FIGS. 7A-7C. Some operations in method 800 are, optionally combined and/or order of some operations is, optionally, changed. At 802a, the method includes presenting, via the display, a user interface having a first user interface region and a second user interface region from a first viewpoint, such as viewpoint 170 in FIG. 7A. The first user interface region includes a first user interface object at a first location of the first user interface region, the first user interface object having a first three-dimensional visual effect, such as first three-dimensional user interface object 700 in FIG. 7B, and a second user interface object at a second location of the first user interface region, the second user interface object having a second three-dimensional visual effect, such as second three-dimensional user interface object 702 in FIG. 7B. In some embodiments, the second three-dimensional visual effect of the second three-dimensional user interface object 702 includes a greater degree of three-dimensional visual effect than the first three-dimensional visual effect of the first three-dimensional user interface object 700. At 802b, the method includes presenting the second user interface region offset from the first user interface region such that the first user interface region is presented at a first depth and the second user interface region is presented at a second depth closer to the computer system than the first depth, such as at a depth 704 in FIG. 7B. An amount of offset is based on the first three-dimensional visual effect of the first user interface object and the second three-dimensional visual effect of the second user interface objects. For example, the computer system is configured to present the second user interface region at a depth 706 in FIG. 7C which is different than depth 704 in FIG. 7B based on the three-dimensional visual effect of the three-dimensional user interface object 702 to prevent the three-dimensional user interface object 702 from obscuring portions of the navigation bar 300 as illustrated in FIG. 7C.

Alternatively or additionally to one or more of the embodiments disclosed above, in some embodiments, the first three-dimensional visual effect of the first user interface object and the second three-dimensional visual effect of the second user interface object correspond to a respective degree of three-dimensional depth of the first user interface object and the second user interface object (e.g., the z-depth that first use interface object and the second user interface object extends from the first user interface region). For example, the computer presents the second user interface region a second depth (e.g., depth 706) greater than the first depth (e.g., depth 704) which corresponds to the degree of three-dimensional visual effect of second three-dimensional user interface object 702 including a greater degree of depth than the degree of depth of the first-three-dimensional user interface object 700. Alternatively or additionally to one or more of the embodiments disclosed above, in some embodiments, the amount of the offset is based on a maximum depth of the first three-dimensional effect of the first user interface object and a maximum depth of the second three-dimensional effect of the second user interface object. In some embodiments, the computer system is configured to present the second user interface region (e.g., navigation bar 300) at a fixed, maximum depth so as to address a variety of three-dimensional objects. Alternatively or additionally to one or more of the embodiments disclosed above, in some embodiments, the amount of the offset is based on a projection of the first user interface object and a projection of the second user interface object relative to the second user interface region. For example, the computer system is configured to dynamically present the second user interface region at depth based on the three-dimensional user interface object projection within a threshold distance from the second user interface region. Alternatively or additionally to one or more of the embodiments disclosed above, in some embodiments, presenting the second user interface region offset from the first user interface region such that the first user interface region is presented at the first depth and the second user interface region is presented at the second depth closer to the computer system than the first depth further includes causing the second user interface region to move forward in a forward projection volume, such as the forward projection volume 115 in FIG. 1B. Alternatively or additionally to one or more of the embodiments disclosed above, in some embodiments, presenting the second user interface region offset from the first user interface region such that the first user interface region is presented at the first depth and the second user interface region is presented at the second depth closer to the computer system than the first depth further includes causing the second user interface region to move backwards in a backward projection volume, such as rear projection volume 125 in FIG. 1B. Alternatively or additionally to one or more of the embodiments disclosed above, in some embodiments, the amount of the offset is bound by a maximum amount of a forward projection volume, such as the maximum forward projection volume of the forward projection volume 115 in FIG. 1B. Alternatively or additionally to one or more of the embodiments disclosed above, in some embodiments, the method further comprises in accordance with a determination that the first three-dimensional visual effect of the first user interface object is greater than a forward projection volume, causing the first user interface object to recede backward, such as three-dimensional user interface object 152 receding backward in the rear projection volume 125 in FIG. 5B. In accordance with a determination that the second three-dimensional visual effect of the second user interface object is greater than the forward projection volume, causing the second user interface object to recede backward. Alternatively or additionally to one or more of the embodiments disclosed above, in some embodiments, the user interface is associated with an instance of a web browser application. Alternatively or additionally to one or more of the embodiments disclosed above, in some embodiments, the first user interface region is associated with a content region having the first and second user interface objects and includes content for a web page. Alternatively or additionally to one or more of the embodiments disclosed above, in some embodiments, the second user interface region is associated with a navigation region having an address bar and a plurality of affordances.

Some embodiments of the disclosure are directed to an electronic device, comprising one or more processors, memory, and one or more programs. The one or more programs are stored in the memory and configured to be executed by the one or more processors. The one or more programs including instructions for presenting, via the display, a user interface having a first user interface region and a second user interface region from a first viewpoint. The first user interface region includes a first user interface object at a first location of the first user interface region, the first user interface object having a first three-dimensional visual effect, and a second user interface object at a second location of the first user interface region, the second user interface object having a second three-dimensional visual effect. The one or more programs further including instructions for presenting the second user interface region offset from the first user interface region such that the first user interface region is presented at a first depth and the second user interface region is presented at a second depth closer to the user than the first depth. An amount of offset is based on the first three-dimensional visual effect of the first user interface object and the second three-dimensional visual effect of the second user interface objects.

Some embodiments of the disclosure are directed to a non-transitory computer readable storage medium storing one or more programs. The one or more programs comprising instructions, which when executed by one or more processors of an electronic device, cause the electronic device to present, via the display, a user interface having a first user interface region and a second user interface region from a first viewpoint. The first user interface region includes a first user interface object at a first location of the first user interface region, the first user interface object having a first three-dimensional visual effect, and a second user interface object at a second location of the first user interface region, the second user interface object having a second three-dimensional visual effect. The one instructions, when executed by the one or more processors of the electronic device, further cause the electronic device to present the second user interface region offset from the first user interface region such that the first user interface region is presented at a first depth and the second user interface region is presented at a second depth closer to the user than the first depth. An amount of offset is based on the first three-dimensional visual effect of the first user interface object and the second three-dimensional visual effect of the second user interface objects.

Some embodiments of the disclosure are directed to an information processing apparatus for use in an electronic device, the information processing apparatus comprising means for presenting, via the display, a user interface having a first user interface region and a second user interface region from a first viewpoint. The first user interface region includes a first user interface object at a first location of the first user interface region, the first user interface object having a first three-dimensional visual effect, and a second user interface object at a second location of the first user interface region, the second user interface object having a second three-dimensional visual effect. The information processing apparatus further comprising means for presenting the second user interface region offset from the first user interface region such that the first user interface region is presented at a first depth and the second user interface region is presented at a second depth closer to the user than the first depth. An amount of offset is based on the first three-dimensional visual effect of the first user interface object and the second three-dimensional visual effect of the second user interface objects.

Figure 9:
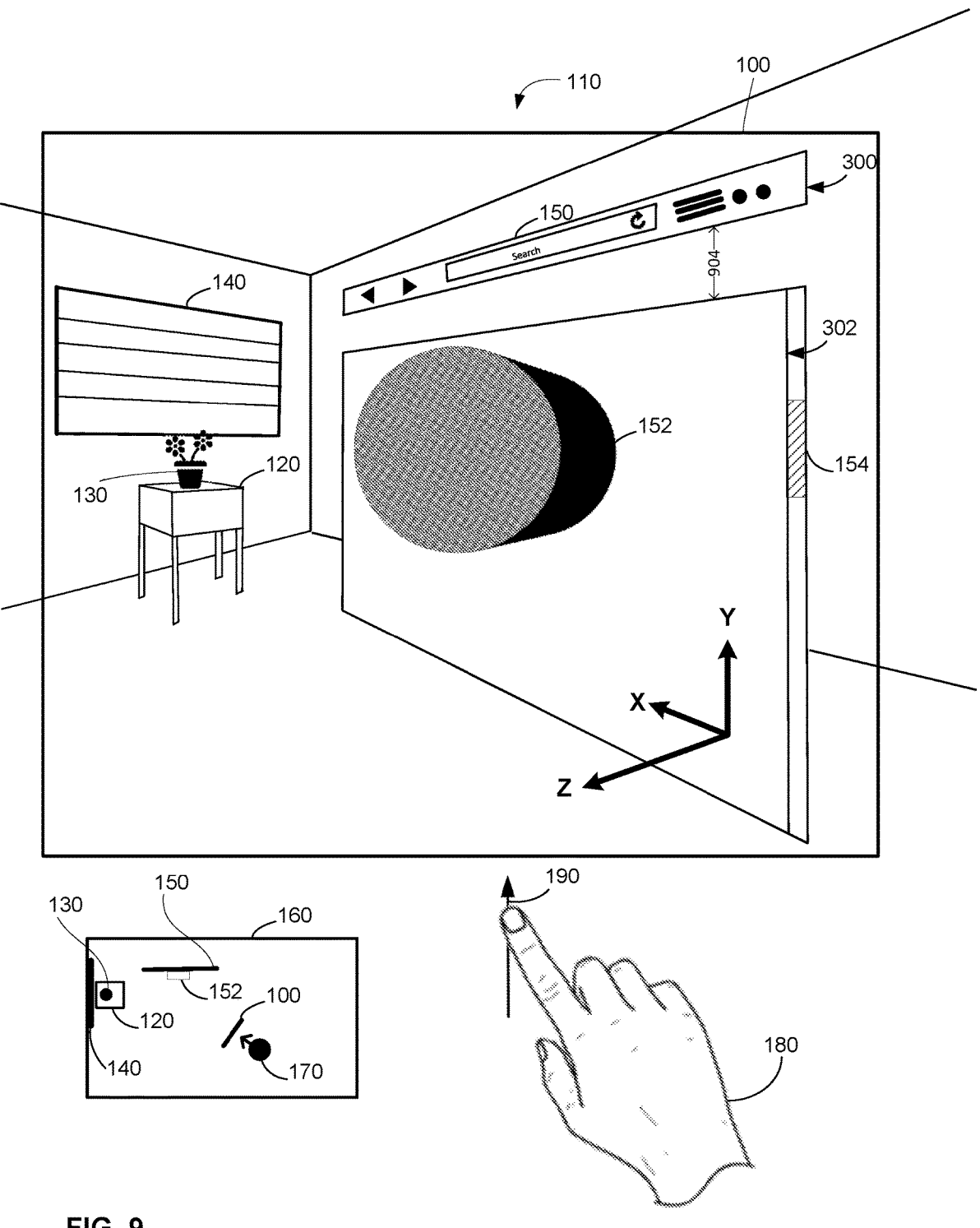
FIG. 9 illustrates a visual treatment applied to the user interface in accordance with some embodiments of the disclosure.

FIG. 9 illustrates a method of another visual treatment to the browser user interface 150 to prevent the three-dimensional user interface object from obscuring portions of the browser user interface 150 according to some embodiments of the disclosure. In some embodiments, so as not to obscure the browser user interface 150, the computer system 100 is configured to present the navigation bar 300 decoupled/detached from the content region 302 (e.g., at a different location relative to the content region 302 than shown in FIG. 3A). For example, in FIG. 9, navigation bar 300 appears detached from (e.g., not connected to) the content region 302. The separation between the navigation bar 300 and the content region 302 can reduce or eliminate the possibility that the content projecting from the content region 302 obscures navigation bar 300 (except possibly at extreme perspective angles, such as when the user's perspective is parallel to the front face of the navigation bar, or within a threshold angle of parallel, such as 1°, 5°, 10°, 25°, etc.).

In some embodiments, the location of the detached navigation bar 300 relative to the content region 302 is fixed such that when the detached navigation bar 300 is displayed, the distance 904 (e.g., in the y-dimension) between the detached navigation bar 300 and the edge of the content region 302 is constant. In some embodiments, the location of the detached navigation bar 300 relative to the content region 302 is dynamic such that when the detached navigation bar 300 is displayed, the distance 904 between the detached navigation bar 300 and the edge of the content region 302 changes based on the content displayed in content region 302. For example, when three-dimensional user interface objects may obscure the navigation bar 300, the distance between the navigation bar 300 and the edge of the content region 302 can relatively increase to avoid the obstruction, whereas when the content of content region 302 may not obscure the navigation bar 300 (e.g., the three-dimensional content does not obstruct the navigation bar 300), the distance 904 between the navigation bar 300 and the edge of the content region 302 can relatively decrease (or may even be zero as shown in FIG. 3A, for example). It is understood that, in some embodiments, when two-dimensional content is shown at or near (within a threshold distance) of the top edge of content region 302, the distance 904 between the navigation bar 300 and content region 302 can be reduced or eliminated. In some embodiments, the change in the distance can be gradual to avoid drastic changes in the position of the chrome relative to the content region. In some embodiments, hysteresis can be applied to the amount of change of distance to avoid changing the distance between the navigation bar and the content region drastically due to changes in the content in content region 302. Although primarily illustrated as a change in the y-dimension, it is understood that the detached chrome may, additionally or alternatively, have a change in position along the x-dimension and/or z-dimension.

In some embodiments, the detached navigation bar 300 is repositioned along with movement of the content region 302. For example, movement of the content region 302 can cause movement of the detached navigation bar 300, where the movement of the detached navigation bar 300 optionally follows the movement of content region 302 with some delay (e.g., a spring or rubber band connection). In some embodiments, the detached navigation bar 300 is decoupled from content region 302 such that repositioned the content region 302 does not reposition the navigation bar 300. In some embodiments, the detached navigation bar 300 is moving in a path corresponding with the viewpoint of the user and/or in a circular path around the content region 302. In some embodiments, the detached navigation bar is at least partially repositioned by following a path around content region 302 (e.g., a circular path, elliptical path, rectangular path, etc.). In some embodiments, the detached navigation bar 300 is displayed anchored at a location associated with the user rather than content region 302. For example, the navigation bar can be anchored to a user's body (e.g., a user's hand or arm).

In some embodiments, the computer system 100 selectively displays the navigation bar 300 to reduce or eliminate the incidence of potential obstruction. For example, the computer system 100 is optionally configured to temporarily inactivate (e.g., cease displaying) the navigation bar 300 until an input corresponding to engagement with the browser user interface 150 is received (e.g., a gesture, gaze, etc.). In some embodiments, the computer system ceases displaying navigation bar 300 (e.g., the navigation bar 300 fades out, hides, or otherwise becomes invisible) if the navigation bar 300 or content region 302 has not been touched for a predetermined time, but the navigation bar 300 optionally reappears and is displayed when a gesture directed to the content region 302 is detected. For example, the navigation bar 300 may fade out after a predetermined number of seconds (e.g., 2, 3, 4, 5, 6, 7, 8, 9, or 10 seconds), thereby allowing the browser user interface 150 to display more of the three-dimensional content on the content region 302 until the user engages with the browser user interface 150 and/or content region 302 again. In some such embodiments, the computer system 100 is configured to, in response to the input, display the detached navigation bar 300 at the location a distance away from the content region 302. When the user ceases engagement for a threshold period of time (e.g., no interaction for 1 second, 3 second, 5 second, 30 second, etc.) or provides alternative input indicating disengagement (e.g., interacting with the content in content region 302 or interacting with another application in the three-dimensional environment), the computer system 100 can optionally be configured to again deactivate the navigation bar. In some embodiments, rather than inactivating the entire navigation bar, a first portion of the navigation bar can continue to be displayed (e.g., the search bar), but a second portion of the navigation bar can cease to be displayed (e.g., additional tabs, user interface elements for reloading the page, moving forward or backward between pages, etc.). These second portions of the navigation bar can be displayed again when user input indicates user engagement. It should be appreciated that although a browser user interface is described, the same visual treatments may be applied to other containers (e.g., windows) in which three-dimensional content is displayed.

In some embodiments, in response to determining active user engagement directed to the navigation bar 300 or the content region 302, the computer system 100 is optionally configured to apply one or more of the visual treatments discussed or illustrated herein, or variations thereof. For example, the computer system 100 presents the navigation bar 300 separated (e.g., detached) from the content region 302 (e.g., at a different location relative to the content region 302) as shown in FIG. 9 in response to the pinch gesture directed to the navigation bar 300 or the content region 302 performed by the user or any input indicative of user engagement directed to the navigation bar 300 or the content region 302. In some embodiments, the computer system does not perform the action associated with detaching the navigation bar 300 from the content region 302 unless and until determining active user engagement directed to the navigation bar 300 or the content region 302. As one of ordinary skill in the art will readily recognize, other passive and/or active events or inputs (e.g., other than pinch gestures) can be detected or received to determine user engagement directed to the navigation bar 300 or the content region 302.

As described herein, in some embodiments, the computer system 100 is configured to present the detached navigation bar 300 (e.g., at a location at a distance from the content region 302 and/or move navigation bar 300 when one or more criteria are satisfied. In some embodiments, the one or more criteria include a criterion that is satisfied when the viewpoint of the user and the three-dimensional projection of the content in content region 302 result in obstruction of the navigation bar 300 by the content in content region 302 without the detachment and/or movement of the navigation bar 300. For example, the computer system 100 detects movement of the viewpoint of the user (e.g., movement and/or change in orientation of the user in the physical environment of the user corresponding to movement of the viewpoint of the user from a first viewpoint to a second viewpoint). In some embodiments, in response to detecting movement of the viewpoint of the user form the first viewpoint to the second viewpoint, the computer system 100 presents the navigation bar 300 detached from the content region 302 (and/or moves the navigation bar 300 as described herein) to avoid obstruction by the content in the content region 302.

Additionally or alternatively, in some embodiments, the one or more criteria include a criterion that is satisfied when the three-dimensional user interface object 152 is at a location that, without presenting a visual treatment as described herein, at least partially obscures a portion of the browser user interface 150 from the perspective of the user. For example, a determination is made as to whether the three-dimensional user interface object 152 is at a location within a threshold distance (e.g., 0.1, 0.3, 0.5, 1, 3, 5, 10, 20, 50 or 100 cm) of the top (or other) boundary of the browser user interface 150 and includes a three-dimensional perspective view that at least partially obscures a portion of the browser user interface 150 (e.g., navigation bar 300). For example, the three-dimensional user interface object 152 at the location intersects one or more of the first plane (e.g., clipping plane) or the second plane of the view volume defined by the direction and the angle from the user's viewpoint 170, as described in the context of method 400.

FIG. 10 is a flowchart illustrating a method 1000 of presenting the navigation bar 300 decoupled/detached from the content region 302 according to some embodiments of the disclosure. The method 1000 is optionally performed at a computer system 100, when presenting three-dimensional virtual objects described above with reference to FIG. 9. Some operations in method 1000 are, optionally combined and/or order of some operations is, optionally, changed. At 1002*a*, the method includes presenting, via the display, a user interface configurable to include a first user interface region and a second user interface region. The user interface is located at a first location in a three-dimensional environment, such as browser user interface 150 in FIG. 9. At 1002*b*, the method includes, while displaying the user interface including the first user interface region and the second user interface region, detecting, via the one or more input devices, a first input, such as hand input 180 in FIG. 9. At 1002*c*, the method includes, in response to detecting the first input, and, in accordance with a determination that the second user interface region at the first location satisfies a set of one or more visibility criteria, presenting, via the display, the user interface with the second user interface region at a second location detached from the first user interface region at the first location in the three-dimensional environment as shown at 1002*d*, such as navigation bar 300 detached from content region 302 in FIG. 9. At 1002*e*, the method includes, in accordance with a determination that the set of one or more visibility criteria is not satisfied, presenting the second user interface region with the first user interface region at the first location, such as the navigation bar and content region attached together in FIG. 3A (e.g., not separated as shown in FIG. 9). Alternatively or additionally to one or more of the embodiments disclosed above, in some embodiments, the second user interface region at the second location does not satisfy the set of one or more criteria.

Alternatively or additionally to one or more of the embodiments disclosed above, in some embodiments, the one or more criteria include a criterion that is satisfied when movement of the viewpoint of the user is detected, such as viewpoint 170 moving from a viewpoint in FIG. 3E to a viewpoint in FIG. 9. Alternatively or additionally to one or more of the embodiments disclosed above, in some embodiments, the one or more criteria include a criterion that is satisfied when a user interface object includes a three-dimensional perspective view that, without presenting the user interface with the second user interface region at a second location detached from the first user interface region, at least partially obscures a portion of the second user interface region. Alternatively or additionally to one or more of the embodiments disclosed above, in some embodiments, the first user interface region is associated with a content region including content for a web page. Alternatively or additionally to one or more of the embodiments disclosed above, in some embodiments, the second user interface region is associated with a chrome region having an address bar and a plurality of affordances. Alternatively or additionally to one or more of the embodiments disclosed above, in some embodiments, the computer system is configured to detect, via the one or more input devices, a portion of the user at a respective location and while detecting the portion of the user at the respective location, presenting the user interface with the second user interface region at the second location detached from the first user interface region comprises presenting the second user interface region anchored to a location corresponding to the respective location of the portion of the user. Alternatively or additionally to one or more of the embodiments disclosed above, in some embodiments, the method further comprises while displaying the user interface including the first user interface region without displaying the second user interface region, detecting, via the one or more input devices, a second input, and in response to detecting the second input, presenting, via the display, the user interface including the first user interface region and the second user interface region. For example, the computer system is configured to only present the second user interface region when user engagement (e.g., gesture, gaze, etc.) is detected. Alternatively or additionally to one or more of the embodiments disclosed above, in some embodiments, wherein presenting, via the display, the user interface configurable to include the second user interface region at the second location around the first user interface region. For example, the computer system is configured to present the navigation bar 300 moving in accordance with the viewpoint of the user and/or in a circular path around the content region 302.

Some embodiments of the disclosure are directed to an electronic device, comprising one or more processors, memory, and one or more programs. The one or more programs are stored in the memory and configured to be executed by the one or more processors. The one or more programs including instructions for presenting, via the display, a user interface configurable to include a first user interface region and a second user interface region. The user interface is located at a first location in a three-dimensional environment. The one or more programs further including instructions for, while displaying the user interface including the first user interface region and the second user interface region, detecting, via the one or more input devices, a first input. The one or more programs further including instructions for, in response to detecting the first input, in accordance with a determination that a set of one or more visibility criteria is satisfied, presenting, via the display, the user interface with the second user interface region at a second location detached from the first user interface region at the first location in the three-dimensional environment, and in accordance with a determination that the set of one or more visibility criteria is not satisfied, presenting the second user interface region with the first user interface region at the first location.

Some embodiments of the disclosure are directed to a non-transitory computer readable storage medium storing one or more programs. The one or more programs comprising instructions, which when executed by one or more processors of an electronic device, cause the electronic device to present, via the display, a user interface configurable to include a first user interface region and a second user interface region. The user interface is located at a first location in a three-dimensional environment. The one instructions, when executed by the one or more processors of the electronic device, further cause the electronic device to, while displaying the user interface including the first user interface region and the second user interface region, detect, via the one or more input devices, a first input. The one instructions, when executed by the one or more processors of the electronic device, further cause the electronic device to, in response to detecting the first input, in accordance with a determination that a set of one or more visibility criteria is satisfied, present, via the display, the user interface with the second user interface region at a second location detached from the first user interface region at the first location in the three-dimensional environment, and in accordance with a determination that the set of one or more visibility criteria is not satisfied, present the second user interface region with the first user interface region at the first location.

Some embodiments of the disclosure are directed to an information processing apparatus for use in an electronic device, the information processing apparatus comprising means for presenting, via the display, a user interface configurable to include a first user interface region and a second user interface region. The user interface is located at a first location in a three-dimensional environment. The information processing apparatus further comprising means for, while displaying the user interface including the first user interface region and the second user interface region, detecting, via the one or more input devices, a first input. The information processing apparatus further comprising means for, in response to detecting the first input, in accordance with a determination that a set of one or more visibility criteria is satisfied, presenting, via the display, the user interface with the second user interface region at a second location detached from the first user interface region at the first location in the three-dimensional environment, and in accordance with a determination that the set of one or more visibility criteria is not satisfied, presenting the second user interface region with the first user interface region at the first location.

FIG. 11 is a flowchart illustrating a method 1100 of presenting the navigation bar 300 always decoupled/detached from the content region 302 according to some embodiments of the disclosure. The method 1100 is optionally performed at a computer system 100, when presenting three-dimensional virtual objects described above with reference to FIG. 9. Some operations in method 1100 are, optionally combined and/or order of some operations is, optionally, changed. At 1102*a*, the method includes presenting, via the display, a user interface configurable to include a first user interface region and a second user interface region, such as navigation bar 300 and content region 302 in FIG. 9. While displaying the user interface including the first user interface region and the second user interface region, the second user interface region is detached from the first user interface region, such as the navigation bar 300 separated from content region 302 in FIG. 9. At 1102*b*, the method includes detecting, via the one or more input devices, a first input, such as hand input 180 (or eye gaze). At 1102*c*, the method includes, in response to detecting the first input, and, in accordance with a determination that the second user interface region at a first location a first distance from the first user interface region satisfies a set of one or more visibility criteria, presenting, via the display, the user interface with the second user interface region at a second location a second distance from the first user interface region as shown at 1102*d*, such as distance 904 in FIG. 9. In some embodiments, the distance 904 is fixed and/or predetermined so as to address a majority of three-dimensional user interface objects. At 1102*e*, the method includes, in accordance with a determination that the second user interface region at the first location the first distance from the first user interface region does not satisfy the set of one or more visibility criteria, presenting, via the display, the user interface with the second user interface region at the first location the first distance from the first user interface region. In some embodiments, the navigation bar and the content region are always presented as detached from one another a distance away. In some embodiments, the distance 904, as shown in FIG. 9 is a fixed distance or a dynamic distance that is reduced or increased in accordance with the one or more criteria discussed herein. Alternatively or additionally to one or more of the embodiments disclosed above, in some embodiments, the second user interface region at the second location the second distance from the first user interface region does not satisfy the set of one or more criteria.

Alternatively or additionally to one or more of the embodiments disclosed above, in some embodiments, the one or more criteria include a criterion that is satisfied when a user interface object includes a three-dimensional perspective view that, without presenting the user interface with the second user interface region at the second location the second distance from the first user interface region, at least partially obscures a portion of the second user interface region. Alternatively or additionally to one or more of the embodiments disclosed above, in some embodiments, the first user interface region is associated with a content region including content for a web page. Alternatively or additionally to one or more of the embodiments disclosed above, in some embodiments, the second user interface region is associated with a chrome region having an address bar and a plurality of affordances. Alternatively or additionally to one or more of the embodiments disclosed above, in some embodiments, the method comprises detecting, via the one or more input devices, a portion of the user at a respective location and while detecting the portion of the user at the respective location, presenting the user interface with the second user interface region at the second location the second distance from the first user interface region comprises presenting the second user interface region anchored to a location corresponding to the respective location of the portion of the user. Alternatively or additionally to one or more of the embodiments disclosed above, in some embodiments, the method further comprises presenting, via the display, the user interface configurable to include the first user interface region and the second user interface region comprises presenting the second user interface region at the first location around the first user interface region.

Some embodiments of the disclosure are directed to an electronic device, comprising one or more processors, memory, and one or more programs. The one or more programs are stored in the memory and configured to be executed by the one or more processors. The one or more programs including instructions for presenting, via the display, a user interface configurable to include a first user interface region and a second user interface region. While displaying the user interface including the first user interface region and the second user interface region, the second user interface region is detached from the first user interface region. The one or more programs further including instructions for, detecting, via the one or more input devices, a first input. The one or more programs further including instructions for, in response to detecting the first input, in accordance with a determination that a set of one or more visibility criteria is satisfied, presenting, via the display, the user interface with the second user interface region at a first location a first distance from the first user interface region, and in accordance with a determination that the set of one or more visibility criteria is not satisfied, presenting, via the display, the user interface with the second user interface region at a second location a second distance from the first user interface region.

Some embodiments of the disclosure are directed to a non-transitory computer readable storage medium storing one or more programs. The one or more programs comprising instructions, which when executed by one or more processors of an electronic device, cause the electronic device to present, via the display, a user interface configurable to include a first user interface region and a second user interface region. Wherein while displaying the user interface including the first user interface region and the second user interface region, the second user interface region is detached from the first user interface region. The one instructions, when executed by the one or more processors of the electronic device, further cause the electronic device to, detecting, via the one or more input devices, a first input. The one instructions, when executed by the one or more processors of the electronic device, further cause the electronic device to, in response to detecting the first input, in accordance with a determination that a set of one or more visibility criteria is satisfied, present, via the display, the user interface with the second user interface region at a first location a first distance from the first user interface region, and in accordance with a determination that the set of one or more visibility criteria is not satisfied, present, via the display, the user interface with the second user interface region at a second location a second distance from the first user interface region.

Some embodiments of the disclosure are directed to an information processing apparatus for use in an electronic device, the information processing apparatus comprising means for presenting, via the display, a user interface configurable to include a first user interface region and a second user interface region. While displaying the user interface including the first user interface region and the second user interface region, the second user interface region is detached from the first user interface region. The information processing apparatus further comprising means for detecting, via the one or more input devices, a first input. The information processing apparatus further comprising means for, in response to detecting the first input, in accordance with a determination that a set of one or more visibility criteria is satisfied, presenting, via the display, the user interface with the second user interface region at a first location a first distance from the first user interface region, and in accordance with a determination that the set of one or more visibility criteria is not satisfied, presenting, via the display, the user interface with the second user interface region at a second location a second distance from the first user interface region.

Figure 12A:
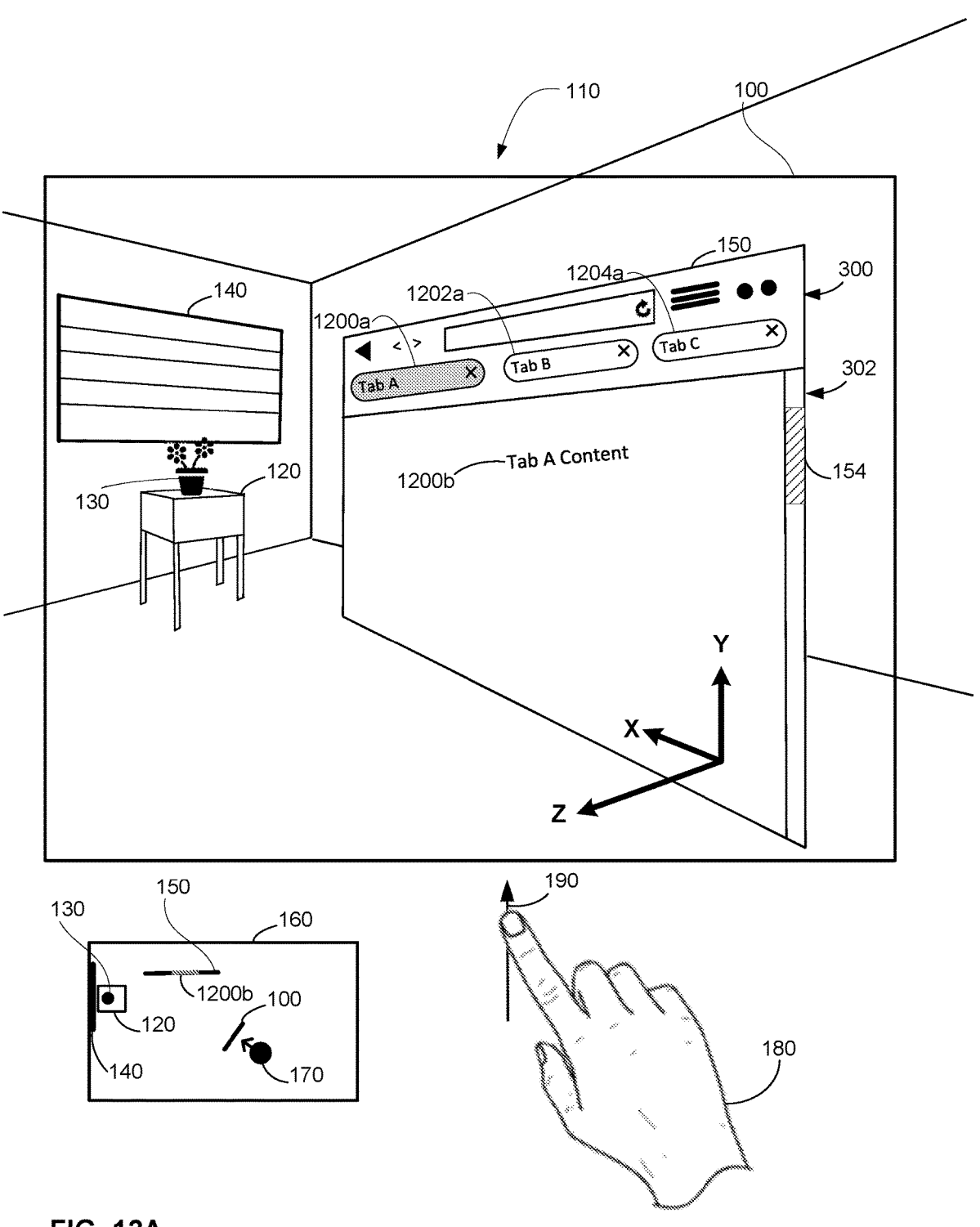
FIGS. 12A-12D illustrate one or more visual treatments applied to the user interface in accordance with some embodiments of the disclosure.
Figure 12B:
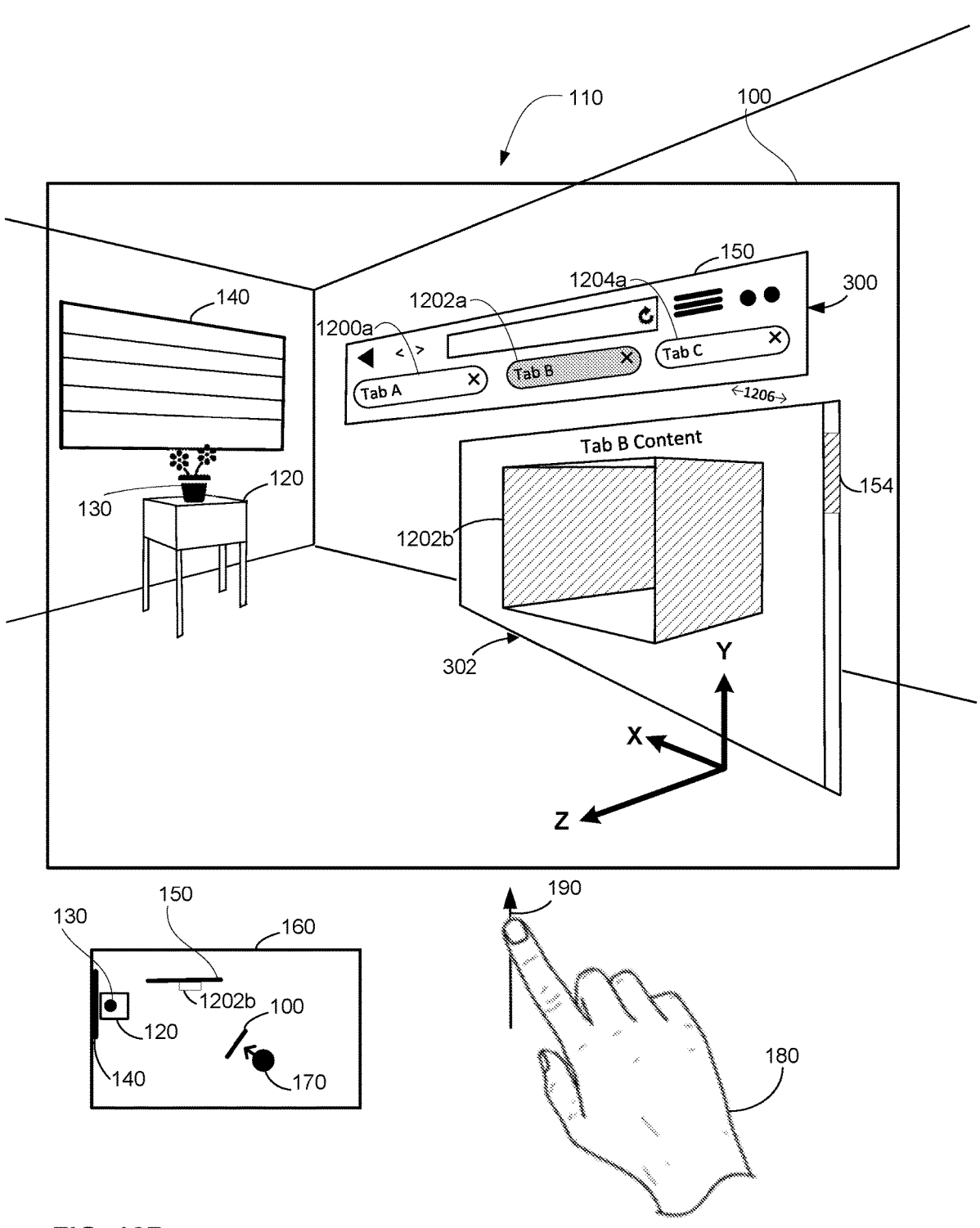
Figure 12C:
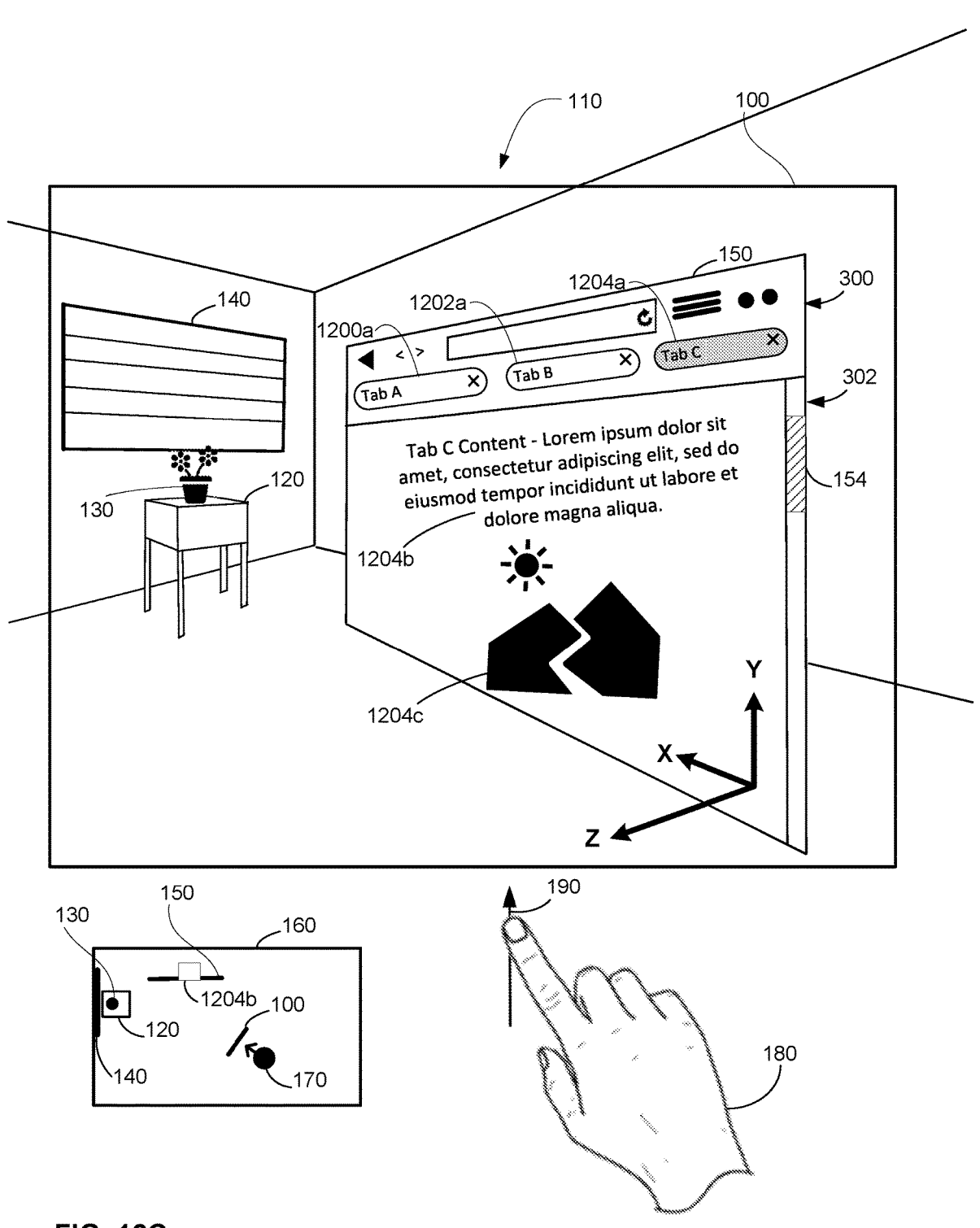

FIGS. 12A-12D illustrate a method of applying a visual treatment to the browser user interface 150 to prevent three-dimensional content, such as three-dimensional user interface object 700 of FIG. 7A from obscuring portions of the browser user interface 150 according to some embodiments of the disclosure. In some embodiments and as shown in FIG. 12A, the browser user interface 150 is configured to support a "tabbed" presentation of content. In some embodiments, the browser user interface 150 maintains content of at least two webpages in association with "tabs." The tabs appear in a tab area of the second user interface region (e.g., navigation bar 300) as shown in FIGS. 12A-12C. In some embodiments, the browser user interface 150 can collapse the tab area of the second user interface region to hide the tabs. In some embodiments, after the tab area is collapsed, the browser user interface 150 can cause the tab area to reappear to thereby revert to displaying the tabs. In some embodiments, when the browser user interface 150 displays the tab area, a portion (e.g., top portion or top boundary) of the first user interface region (e.g., content region 302) is occluded or covered by the tab area. In some embodiments, when the browser user interface 150 does not display the tab area, there is a small gap between the top boundary of the first user interface region and the bottom boundary of the second user interface region. In some embodiments, when the browser user interface 150 presents the tab area, the tab area bridges (covers) the gap between the top boundary of the first user interface region and the bottom boundary of the second user interface region. Returning to FIG. 12A, the navigation bar 300 while operating according to a tabbed presentation includes tab 1200a, tab 1202a, and tab 1204a. In this example, tab 1200a is the active tab in that content (e.g., content 1200b) associated with tab 1200a is currently presented in the content region 302 (e.g., content of tabs 1202a and 1204a are not displayed in content region 302). In this embodiment, content item 1200b corresponds to content of a first dimensionality (e.g., two-dimensional content); however, the browser user interface 150 can be used to navigate among other types of content items including content of a second dimensionality (e.g., three-dimensional content).

In some embodiments, so as not to obscure the browser user interface 150 while presenting three-dimensional content, the computer system 100 is configured to present the content region 302 at one of a plurality of predetermined depths. For example, while presenting content 1200b of tab 1200a, the computer system presents the content region 302 at a first depth and the navigation bar 300 at a second depth, wherein the first depth corresponds to the second depth (e.g., the first depth equals the second depth for two-dimensional content). In some embodiments, the computer system receives an input (e.g., user input) to present another tab, such as tab 1202a, and in response, the computer system presents, as shown in FIG. 12B, content 1202b of the second dimensionality (e.g., three-dimensional content) in the content region 302. As shown in FIG. 12B, the computer system presents the content region 302 at a third depth, different from the first depth, and the navigation bar 300 remains at the second depth. In some embodiments, the computer system presents the content region 302 offset from the navigation bar 300 at a depth further from a front face of the user interface object 150 or a perspective of the computer system than the depth of the navigation bar 300. In FIG. 12B, the amount of the offset can be represented by depth 1206. In some embodiments, the computer system presents the content region 302 at the third depth further from the front face of the user interface object 150 or computer system than the first depth and the second depth to provide the visual appearance that the content region 302 is pushed back in z-depth. In some embodiments, presenting the content region 302 at the third depth provides room for content 1202b to project from content region 302 (e.g., into a forward projection region) as shown in FIG. 12B to remain three-dimensional without obscuring navigation bar 300.

In some embodiments, the third depth is based on an amount of forward projection of the three-dimensional content from the content region 302. The greater the projections of the three-dimensional content, the further the content region 302 is pushed back in z-depth. For example, the computer system presents the content region 302 offset from the navigation bar 300 as described with reference to method 800.

In some embodiments, the computer system is configured to present an animation (e.g., fade in or out) of a transition between presenting the content 1200b associated with tab 1200a and content 1202b associated with 1202a in the content region 302. In some embodiments, the animation includes ceasing to display, fading out, or decreasing the opacity of the content associated with tab 1200a. In some embodiments, the animation includes displaying, fading in, or increasing the opacity of the content 1202b associated with tab 1202a.

Additionally or alternatively, the computer system is configured to provide a portal view of three-dimensional content. For example, in FIG. 12C, tab 1204a corresponds to another tab (e.g., content region 302) comprising content 1204b at a first location of the content region 302 (e.g., top portion of the content region 302) and 1204c located at a second location of the content region 302 below content 1204b. In some embodiments, content 1204b corresponds to content of a first dimensionality (e.g., two-dimensional content) and content 1204c includes a portal to content of a second dimensionality (e.g., three-dimensional content). In some embodiments, the portal (e.g., content 1204c) gives an appearance of viewing through a "window" into the three-dimensional content (e.g., three-dimensional environment). In some embodiments, the portal is configured as an opening (e.g., two-dimensionally flat or including a flat region and/or three-dimensional) on the surface of content region 302 to view the three-dimensional environment or virtual content (e.g., different from the three-dimensional environment) beyond the window. The portions of the content that are presented and/or visible in the portal are optionally based on the user's viewpoint and/or the angle from which the portal is being viewed. For example, if the user's viewpoint moves rightward relative to the portal and/or if the angle from which the portal is being viewed via the electronic device changes to be more rightward from the normal of the portal, portions of the content that are to the left of the previously displayed content through the portal that were not previously displayed (e.g., before the change in the viewpoint) are optionally revealed by the electronic device, and portions of the content that are to the right of the previously displayed content through the that were previously displayed (e.g., before the change in the viewpoint) are optionally hidden (e.g., no longer visible). Similarly, if the user's viewpoint moves leftward relative to the portal and/or if the angle from which the portal is being viewed via the electronic device changes to be more leftward from the normal of the portal, portions of the content that are to the right of the previously displayed content that were not previously displayed (e.g., before the change in the viewpoint) are optionally revealed by the electronic device via the portal, and portions of the content that are to the left of the previously displayed content that were previously displayed (e.g., before the change in the viewpoint) are optionally hidden (e.g., no longer visible) via the portal. The portal can also display different parts of the content when the user's viewpoint changes in an upward or downward direction.

For example, while presenting content 1204b at the first location and content 1204c at the second location of tab 1204a in the content region 302 with the content region 302 at the first depth and the navigation bar 300 at the second depth, wherein the first depth corresponds to the second depth, the computer system detects an input requesting to scroll content 1204c towards a top boundary of the content region 302. In some embodiments, the input can correspond to a request to present content 1204b in content region 302 such that content 1204b is not displayed in content region 302, as shown in FIG. 12D.

Figure 12D:
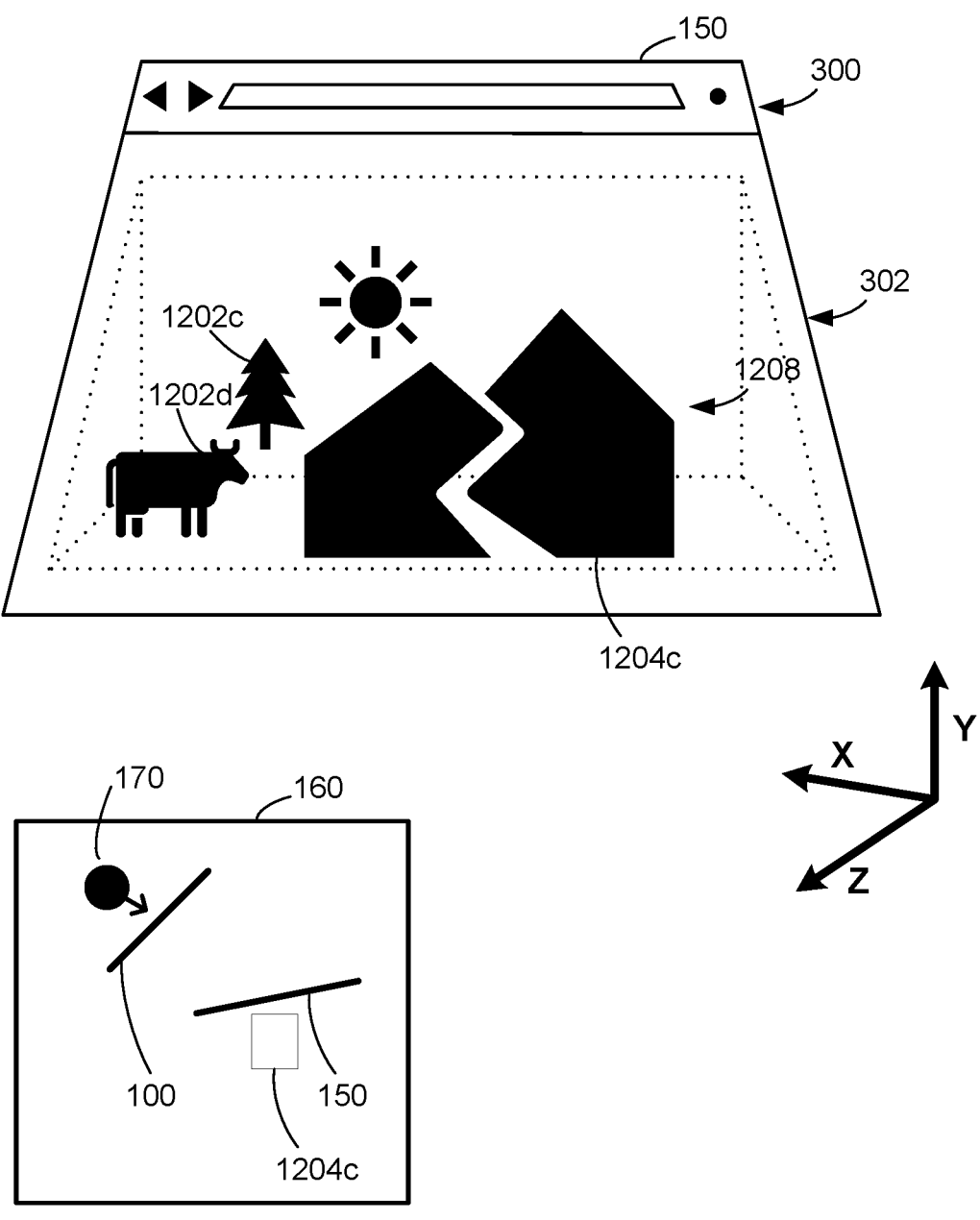

As shown in FIG. 12D and in some embodiments, in response to detecting the input requesting to scroll content 1204c towards a top boundary of the content region 302, the computer system presents content 1204c at a third location, different from the second location, in the content region 302 with the content region 302 at the first depth and the navigation bar 300 at the second depth in accordance with the input. In some embodiments, presenting the portal (e.g., content 1204c) at the third location includes presenting at least a portion of the content 1204c in a rear projection region 1208 behind the third location at the third depth further from the computer system than the content region 302 at the first depth as shown in FIG. 12D.

FIG. 13 is a flowchart illustrating a method 1300 of presenting switching between a tab with two-dimensional content and another tab with three-dimensional content according to some embodiments of the disclosure. The method 1300 is optionally performed at a computer system 100, when presenting three-dimensional virtual objects described above with reference to FIGS. 12A and 12B. Some operations in method 1300 are, optionally combined and/or order of some operations is, optionally, changed. At 1302a, the method includes presenting, via the display, a user interface having a first user interface region, such as content region 302 in FIG. 12A and a second user interface region, such as navigation bar 300 in FIG. 12A, wherein the first user interface region is configurable to present content corresponding to a plurality of tabs including a first tab (e.g. content region 302 in FIG. 12A) and a second tab (e.g. content region 302 in FIG. 12B), and wherein the second user interface region is expandable to include a plurality of tab user interface elements corresponding to the plurality of tabs, the plurality of tab user interface elements including a first tab user interface element, such as tab 1200a in FIG. 12A corresponding to the first tab and a second tab user interface element, such as tab 1202a in FIG. 12A corresponding to the second tab, wherein the first tab user interface element corresponds to first content of a first dimensionality (e.g., two-dimensional), such as content 1200b in FIG. 12A and the second tab user interface element corresponds to second content of a second dimensionality (e.g., three-dimensional), such as content 1202b in FIG. 12B, different from the first dimensionality. At 1302b, the method includes while presenting the first content of the first tab in the first user interface region with the first user interface region at a first depth and the second user interface region at a second depth such as in FIG. 12A, receiving an input requesting to transition from the first tab to the second tab. At 1302c, the method includes in accordance with the input requesting to transition from the first tab to the second tab, presenting the second content of the second tab in the first user interface region with the first user interface region at a third depth, different from the first depth, and the second user interface region is at the second depth, such as in FIG. 12B.

Alternatively or additionally to one or more of the embodiments disclosed above, in some embodiments, the first depth is the same as the second depth, such as in FIG. 12A. Alternatively or additionally to one or more of the embodiments disclosed above, in some embodiments, the first depth is different from the second depth, such as in FIG. 12B. Alternatively or additionally to one or more of the embodiments disclosed above, in some embodiments, the first user interface region is configurable to be presented at one of a plurality of predetermined depths, including the first depth and the third depth, such as depth 1206 in FIG. 12B. Alternatively or additionally to one or more of the embodiments disclosed above, in some embodiments, the first content of the first dimensionality is two-dimensional content, such as content 1200b in FIG. 12A and the second content of the second dimensionality is three-dimensional content, such as content 1202b in FIG. 12B and the third depth is further from a point of view of the computer system than the first depth, such as content region 302 in FIG. 12B. Alternatively or additionally to one or more of the embodiments disclosed above, in some embodiments, the third depth is based on an amount of projection of the second content of the second dimensionality from the first user interface region.

Alternatively or additionally to one or more of the embodiments disclosed above, in some embodiments, the method comprises presenting, via the display, an animation of a transition between presenting the first content of the first tab in the first user interface region with the first user interface region at the first depth and presenting the second content of the second tab in the first user interface region with the first user interface region at the third depth, such as in FIG. 12B. Alternatively or additionally to one or more of the embodiments disclosed above, in some embodiments, the method comprises in accordance with the input requesting to transition from the first tab to the second tab, changing one or more visual characteristics of one or more edges of the first user interface region. Alternatively or additionally to one or more of the embodiments disclosed above, in some embodiments, the method comprises in accordance with the input requesting to transition from the first tab to the second tab, while presenting the second content of the second tab in the first user interface region, ceasing to present the first content of the first tab. Alternatively or additionally to one or more of the embodiments disclosed above, in some embodiments, the method comprises while presenting the second content of the second tab in the first user interface region with the first user interface region at the third depth, receiving an input requesting to transition from the second tab to the first tab and in accordance with the input requesting to transition from the second tab to the first tab, presenting the first content of the first tab in the first user interface region with the first user interface region at the first depth and the second user interface region at the second depth, such as in FIG. 12A.

Alternatively or additionally to one or more of the embodiments disclosed above, in some embodiments, the input requesting to transition from the first tab to the second tab corresponds to selection of the second tab user interface element, such as tab 1202*a* in FIG. 12B. Alternatively or additionally to one or more of the embodiments disclosed above, in some embodiments, the method comprises while presenting the second user interface region expanded to include the plurality of tab user interface elements including the first tab user interface element and the second tab user interface element, the plurality of tab user interface elements occludes a portion of the first user interface region. Alternatively or additionally to one or more of the embodiments disclosed above, in some embodiments, the plurality of tab user interface elements including a third tab user interface element, such as tab 1204*a* in FIG. 12C corresponding to a third tab (e.g., content region 302 in FIG. 12C), wherein the third tab user interface element includes third content of the first dimensionality, such as content 1204*b*, and fourth content of the second dimensionality, such as content 1204*c* in FIG. 12C. Alternatively or additionally to one or more of the embodiments disclosed above, in some embodiments, the method comprises while presenting the third content at a first location and the fourth content at a second location of the third tab in the first user interface region with the first user interface region at the first depth and the second user interface region at the second depth, such as in FIG. 12C, detecting an input requesting to scroll the fourth content towards a boundary of the first user interface region and in response to detecting the input, the method comprises presenting the fourth content at a third location, different from the second location, in the first user interface region with the first user interface region at the first depth and the second user interface region at the second depth in accordance with the input, wherein presenting the fourth content at the third location includes presenting at least a portion of the fourth content in a rear projection region behind the third location at the third depth further from the computing system than the first user interface region at the first depth, such as in FIG. 12D.

Some embodiments of the disclosure are directed to an electronic device, comprising one or more processors, memory, and one or more programs. The one or more programs are stored in the memory and configured to be executed by the one or more processors. The one or more programs including instructions for presenting, via the display, a user interface having a first user interface region and a second user interface region, wherein the first user interface region is configurable to present content corresponding to a plurality of tabs including a first tab and a second tab, and wherein the second user interface region is expandable to include a plurality of tab user interface elements corresponding the plurality of tabs, the plurality of tab user interface elements including a first tab user interface element corresponding to the first tab and a second tab user interface element corresponding to the second tab, wherein the first tab user interface element corresponds to first content of a first dimensionality and the second tab user interface element corresponds to second content of a second dimensionality, different from the first dimensionality. While presenting the first content of the first tab in the first user interface region with the first user interface region at a first depth and the second user interface region at a second depth, the one or more programs further including instructions for, receiving an input requesting to transition from the first tab to the second tab and in accordance with the input requesting to transition from the first tab to the second tab, the one or more programs further including instructions for presenting the second content of the second tab in the first user interface region with the first user interface region at a third depth, different from the first depth, and the second user interface region is at the second depth.

Some embodiments of the disclosure are directed to a non-transitory computer readable storage medium storing one or more programs. The one or more programs comprising instructions, which when executed by one or more processors of an electronic device, cause the electronic device to present, via the display, a user interface having a first user interface region and a second user interface region, wherein the first user interface region is configurable to present content corresponding to a plurality of tabs including a first tab and a second tab, and wherein the second user interface region is expandable to include a plurality of tab user interface elements corresponding the plurality of tabs, the plurality of tab user interface elements including a first tab user interface element corresponding to the first tab and a second tab user interface element corresponding to the second tab, wherein the first tab user interface element corresponds to first content of a first dimensionality and the second tab user interface element corresponds to second content of a second dimensionality, different from the first dimensionality. While presenting the first content of the first tab in the first user interface region with the first user interface region at a first depth and the second user interface region at a second depth, the one instructions, when executed by the one or more processors of the electronic device, further cause the electronic device to, in accordance with the input requesting to transition from the first tab to the second tab, present the second content of the second tab in the first user interface region with the first user interface region at a third depth, different from the first depth, and the second user interface region is at the second depth.

Some embodiments of the disclosure are directed to an information processing apparatus for use in an electronic device, the information processing apparatus comprising means for presenting, via the display, a user interface having a first user interface region and a second user interface region, wherein the first user interface region is configurable to present content corresponding to a plurality of tabs including a first tab and a second tab, and wherein the second user interface region is expandable to include a plurality of tab user interface elements corresponding the plurality of tabs, the plurality of tab user interface elements including a first tab user interface element corresponding to the first tab and a second tab user interface element corresponding to the second tab, wherein the first tab user interface element corresponds to first content of a first dimensionality and the second tab user interface element corresponds to second content of a second dimensionality, different from the first dimensionality. While presenting the first content of the first tab in the first user interface region with the first user interface region at a first depth and the second user interface region at a second depth, the information processing apparatus further comprising means for receiving an input requesting to transition from the first tab to the second tab and in accordance with the input requesting to transition from the first tab to the second tab, the information processing apparatus further comprising means for presenting the second content of the second tab in the first user interface region with the first user interface region at a third depth, different from the first depth, and the second user interface region is at the second depth.

Some embodiments of the disclosure are directed to an electronic device, comprising one or more processors, memory, and one or more programs, wherein the one or more programs are stored in the memory and configured to be executed by the one or more processors, the one or more programs including instructions for performing any of the methods disclosed above.

Some embodiments of the disclosure are directed to a non-transitory computer readable storage medium storing one or more programs, the one or more programs comprising instructions, which when executed by one or more processors of an electronic device, cause the electronic device to perform any of the methods disclosed above.

Some embodiments of the disclosure are directed to an electronic device, comprising one or more processors, memory, and means for performing any of the methods disclosed above.

Some embodiments of the disclosure are directed to an information processing apparatus for use in an electronic device, the information processing apparatus comprising means for performing any of the methods disclosed above.

It should be appreciated that, in some embodiments, the types of visual treatments presented by the computer system 100 include a combination of visual treatments. For example, the computer system 100 is configured to push back the three-dimensional content into the rear projection volume 125 as depicted by 504 in FIG. 5B and present the navigation bar 300 detached from the content region 302 as depicted in FIG. 9. Optionally, the computer system 100 is configured to change the visual effect (e.g., apply a visual treatment feedback) to the three-dimensional content that indicates that the three-dimensional content has changed visual effect, such as visual indication 304 in FIG. 3C. In another embodiment, the computer system 100 is optionally configured to present the navigation bar 300 offset from the content region 302 (e.g., the navigation bar 300 is presented at a depth 704 closer to the user's viewpoint than the depth of the content region 302) as depicted in FIG. 7A and to push back the three-dimensional content into the rear projection volume 125 as depicted by 504 in FIG. 5B to avoid obscuring the modal window and/or the chrome. In another embodiment, the computer system 100 is optionally configured to present the content region 302 offset from the navigation bar 300 (e.g., the content region 302 is presented at a depth 1206 further from computer system than the depth of the navigation bar 300) as depicted in FIG. 12B. Optionally, the computer system 100 is configured to provide a portal configured as an opening (e.g., two-dimensionally flat or including a flat region and/or three-dimensional) on the surface of content region 302 to view a three-dimensional environment or virtual content as depicted in FIGS. 12C and 12D. As discussed, visual treatments discussed or illustrated herein, or variations thereof, can comprise any combination of visual treatment elements, as desired or required by one or more applications and/or one or more three-dimensional objects.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a computer system in communication with a display and one or more input devices:
presenting, via the display, a user interface having a first user interface region and a second user interface region from a viewpoint of a user of the computer system, wherein the first user interface region includes a user interface object at a first location of the first user interface region, the user interface object having a three-dimensional visual effect;
while presenting the user interface, receiving, via the one or more input devices, an input corresponding to a request to move the user interface object from the first location within the first user interface region towards a second location within the first user interface region corresponding to the second user interface region; and
in response to detecting the input:
moving the user interface object to the second location, different from the first location, in the first user interface region in accordance with the input;
in accordance with a determination that the user interface object at the second location satisfies a set of one or more visibility criteria with respect to the second user interface region from the viewpoint of the user of the computer system, applying a first visual treatment to the user interface object; and
in accordance with a determination that the user interface object at the second location does not satisfy the one or more visibility criteria, forgoing applying the first visual treatment to the user interface object.

2. The method of claim 1, wherein the set of one or more visibility criteria include a criterion that is satisfied when the user interface object at the second location includes the three-dimensional visual effect that, without applying the first visual treatment, at least partially obscures a portion of the second user interface region from the viewpoint.

3. The method of claim 1, wherein applying the first visual treatment to the user interface object according to a view volume from the viewpoint includes presenting a clipped user interface object at an intersection of the user interface object and a plane of the view volume such that a portion of the user interface object outside the view volume is not presented.

4. The method of claim 1, wherein the user interface is associated with an instance of a web browser application.

5. The method of claim 1, wherein the first user interface region is associated with a content region having the user interface object and includes content for a web page.

6. The method of claim 1, wherein the second user interface region is associated with a navigation region having an address bar and a plurality of affordances.

7. The method of claim 1, wherein applying the first visual treatment to the user interface object includes presenting a first portion of the user interface object on a first side of a plane without presenting a second portion of the user interface object on the first side of the plane and applying an appearance of an exterior surface of the second portion of the user interface object to the exterior surface of the user interface object at the plane.

8. The method of claim 1, wherein the one or more visibility criteria include a criterion that is satisfied when the user interface object at the second location intersects a plane of a view volume defined by a direction and angle from the viewpoint.

9. The method of claim 1, further comprising:

in accordance with the determination that the user interface object at the second location satisfies the set of one or more visibility criteria, applying a second visual treatment to the user interface object or applying the second visual treatment to a boundary of the first user interface region, wherein the second visual treatment comprises highlighting.

10. An electronic device, comprising:

one or more processors;

memory; and one or more programs, wherein the one or more programs are stored in the memory and configured to be executed by the one or more processors, the one or more programs including instructions for:

presenting, via a display, a user interface having a first user interface region and a second user interface region from a viewpoint of a user of the electronic device, wherein the first user interface region includes a user interface object at a first location of the first user interface region, the user interface object having a three-dimensional visual effect;

while presenting the user interface, receiving, via one or more input devices, an input corresponding to a request to move the user interface object from the first location within the first user interface region towards a second location within the first user interface region corresponding to the second user interface region; and in response to detecting the input:

moving the user interface object to a second location, different from the first location, in the first user interface region in accordance with the input;

in accordance with a determination that the user interface object at the second location satisfies a set of one or more visibility criteria with respect to the second user interface region from the viewpoint of the user of the electronic device, applying a first visual treatment to the user interface object; and in accordance with a determination that the user interface object at the second location does not satisfy the one or more visibility criteria, forgoing applying the first visual treatment to the user interface object.

11. The electronic device of claim 10, wherein the set of one or more visibility criteria include a criterion that is satisfied when the user interface object at the second location includes the three-dimensional visual effect that, without applying the first visual treatment, at least partially obscures a portion of the second user interface region from the viewpoint.

12. The electronic device of claim 10, wherein applying the first visual treatment to the user interface object according to a view volume from the viewpoint includes presenting a clipped user interface object at an intersection of the user interface object and a plane of the view volume such that a portion of the user interface object outside the view volume is not presented.

13. The electronic device of claim 10, wherein the user interface is associated with an instance of a web browser application.

14. The electronic device of claim 10, wherein the first user interface region is associated with a content region having the user interface object and includes content for a web page.

15. The electronic device of claim 10, wherein the second user interface region is associated with a navigation region having an address bar and a plurality of affordances.

16. The electronic device of claim 10, wherein applying the first visual treatment to the user interface object includes presenting a first portion of the user interface object on a first side of a plane without presenting a second portion of the user interface object on the first side of the plane and applying an appearance of an exterior surface of the second portion of the user interface object to the exterior surface of the user interface object at the plane.

17. The electronic device of claim 10, wherein the one or more visibility criteria include a criterion that is satisfied when the user interface object at the second location intersects a plane of a view volume defined by a direction and angle from the viewpoint.

18. The electronic device of claim 10, further comprising:

in accordance with the determination that the user interface object at the second location satisfies the set of one or more visibility criteria, applying a second visual treatment to the user interface object or applying the second visual treatment to a boundary of the first user interface region, wherein the second visual treatment comprises highlighting.

19. A non-transitory computer readable storage medium storing one or more programs, the one or more programs comprising instructions, which when executed by one or more processors of an electronic device, cause the electronic device to perform a method comprising:

presenting, via a display, a user interface having a first user interface region and a second user interface region from a viewpoint of a user of the electronic device, wherein the first user interface region includes a user interface object at a first location of the first user interface region, the user interface object having a three-dimensional visual effect;

while presenting the user interface, receiving, via one or more input devices, an input corresponding to a request to move the user interface object from the first location within the first user interface region towards a second location within the first user interface region corresponding to the second user interface region; and in response to detecting the input:

moving the user interface object to a second location, different from the first location, in the first user interface region in accordance with the input;

in accordance with a determination that the user interface object at the second location satisfies a set of one or more visibility criteria with respect to the second user interface region from the viewpoint of the user of the electronic device, applying a first visual treatment to the user interface object; and in accordance with a determination that the user interface object at the second location does not satisfy the one or more visibility criteria, forgoing applying the first visual treatment to the user interface object.

20. The non-transitory computer readable storage medium of claim 19, wherein the set of one or more visibility criteria include a criterion that is satisfied when the user interface object at the second location includes the three-dimensional visual effect that, without applying the first visual treatment, at least partially obscures a portion of the second user interface region from the viewpoint.

\* \* \* \* \*